United States Patent
Shimizu et al.

(10) Patent No.: US 12,468,135 B2
(45) Date of Patent: Nov. 11, 2025

(54) SLIT LAMP MICROSCOPE

(71) Applicant: Topcon Corporation, Tokyo (JP)

(72) Inventors: Hitoshi Shimizu, Tokyo (JP); Hisashi Tsukada, Hachioji (JP)

(73) Assignee: TOPCON CORPORATION, Tokyo (JP)

( * ) Notice: Subject to any disclaimer, the term of this patent is extended or adjusted under 35 U.S.C. 154(b) by 437 days.

(21) Appl. No.: 18/011,538

(22) PCT Filed: May 13, 2021

(86) PCT No.: PCT/JP2021/018135
§ 371 (c)(1),
(2) Date: Dec. 20, 2022

(87) PCT Pub. No.: WO2021/261103
PCT Pub. Date: Dec. 30, 2021

(65) Prior Publication Data
US 2023/0359008 A1    Nov. 9, 2023

(30) Foreign Application Priority Data

Jun. 26, 2020   (JP) .................. 2020-110410

(51) Int. Cl.
*G02B 21/00*   (2006.01)
*G02B 21/36*   (2006.01)

(52) U.S. Cl.
CPC ..... *G02B 21/0032* (2013.01); *G02B 21/0028* (2013.01); *G02B 21/008* (2013.01); *G02B 21/36* (2013.01)

(58) Field of Classification Search
CPC ............ G02B 21/0032; G02B 21/0028; G02B 21/008; G02B 21/36; G02B 21/00; G02B 21/0004; G02B 21/002; G02B 21/0036; G02B 21/0052; G02B 21/006; G02B 21/06; G02B 21/361; G02B 21/365;
(Continued)

(56) References Cited

U.S. PATENT DOCUMENTS

2014/0211156 A1   7/2014  Masaki et al.
2015/0085252 A1   3/2015  Fujimura et al.
(Continued)

FOREIGN PATENT DOCUMENTS

JP      2000-116732 A     4/2000
JP      2008-284273 A    11/2008
(Continued)

OTHER PUBLICATIONS

International Search Report and Written Opinion mailed on Jul. 20, 2021, received for PCT Application PCT/JP2021/018135, filed on May 13, 2021, 9 pages including English Translation.
(Continued)

*Primary Examiner* — Arnel C Lavarias
(74) *Attorney, Agent, or Firm* — XSENSUS LLP

(57)  ABSTRACT

A slit lamp microscope according to an embodiment example includes a scanner and a memory. The scanner is configured to perform application of a scan with slit light to a three dimensional region including a corner angle of a subject's eye to collect an image group. The memory is configured to store the image group collected by the scanner.

20 Claims, 15 Drawing Sheets

(58) Field of Classification Search
CPC ....... G02B 21/367; A61B 3/00; A61B 3/0008;
A61B 3/10; A61B 3/117; A61B 3/1173;
A61B 3/13; A61B 3/135; A61B 3/14;
A61B 3/145
USPC ....... 359/385, 362, 363, 368, 369, 384, 388,
359/390, 433; 351/205, 206, 214, 221
See application file for complete search history.

(56) References Cited

U.S. PATENT DOCUMENTS

| | | |
|---|---|---|
| 2016/0345822 A1 | 12/2016 | Fujimura et al. |
| 2017/0014025 A1 | 1/2017 | Uchida et al. |
| 2017/0156591 A1 | 6/2017 | Berestka et al. |
| 2017/0231491 A1 | 8/2017 | Tanassi et al. |
| 2018/0035885 A1 | 2/2018 | Uchida et al. |
| 2021/0153735 A1* | 5/2021 | Tsukada .................. G16H 50/50 |
| 2021/0153740 A1* | 5/2021 | Oomori .................. A61B 3/135 |
| 2022/0133144 A1* | 5/2022 | Shimizu .................. A61B 3/14 |
| | | 351/206 |

FOREIGN PATENT DOCUMENTS

| | | |
|---|---|---|
| JP | 2010-042068 A | 2/2010 |
| JP | 2013-248376 A | 12/2013 |
| JP | 2014-147501 A | 8/2014 |
| JP | 2016-159073 A | 9/2016 |
| JP | 2016-179004 A | 10/2016 |
| JP | 2017-018435 A | 1/2017 |
| JP | 2017-517362 A | 6/2017 |

OTHER PUBLICATIONS

Japanese Office Action issued Jul. 9, 2024, in corresponding Japanese Patent Application 2020-110410, 8pp.

* cited by examiner

SLIT LAMP MICROSCOPE

CROSS-REFERENCE TO RELATED APPLICATIONS

This application is a national stage (under 35 U.S.C. 371) of International Patent Application No. PCT/JP2021/018135, filed May 13, 2021, claiming priority to Japanese Patent Application No. 2020-110410, filed Jun. 26, 2020, both of which are herein incorporated by reference in their entirety.

FIELD

The present disclosure relates to a slit lamp microscope.

BACKGROUND

Diagnostic imaging serves an important role in the field of ophthalmology. Diagnostic imaging uses various kinds of ophthalmic imaging apparatuses. Types of examples of ophthalmic imaging apparatuses include a slit lamp microscope, a fundus camera, a scanning laser ophthalmoscope (SLO), an optical coherence tomography (OCT) apparatus, and so forth.

A slit lamp microscope is the most widely and frequently utilized apparatuses among such various kinds of ophthalmic apparatuses. A slit lamp microscope is used for illuminating a subject's eye with slit light and observing and/or photographing the illuminated cross section from an oblique or side position with a microscope (see, for example, following Patent Documents 1 and 2).

One of the main uses of a slit lamp microscope is observation of anterior eye segments. When observing an anterior eye segment, a doctor observes an entire anterior eye segment while moving the focal position and the area illuminated by slit light, thereby determining the presence or absence of abnormality. Further, a slit lamp microscope may also be used for prescription of vision correction devices such as for checking of a fitting state of a contact lens. In addition, a slit lamp microscope may also be used by a person, such as an optometrist, allied health professional, or a clerk in an optician's store, who is not a medical doctor in order to conduct screening and follow-up observations for eye diseases or the like.

Recent advances in information and communication technology have been enhancing the progress of research and development related to telemedicine. Telemedicine is the act of using communication networks such as the Internet to provide medical care (diagnosis, treatment) to patients in remote places. Techniques for operating a slit lamp microscope from a remote location are disclosed in the following Patent Documents 3 and 4.

Acquisition of an appropriate image using a slit lamp microscope requires fine and complicated operations such as illumination angle adjustment and photographing angle adjustment. The techniques disclosed in Patent Documents 3 and 4 require an examiner, who is at a remote place, to conduct operations that are difficult even in the case where the examiner is observing the eyes of a subject face to face. This causes problems such as prolongation of examination time length and impossibility of acquisition of good images.

While slit lamp microscopes are useful and effective for screening, follow-up observations, and other examinations as described above, a current problem is that shortage of persons who are skilled in operating slit lamp microscopes makes it impossible for high quality slit lamp microscope examinations to be provided to many people.

Furthermore, in telemedicine and screening, it is often the case that the doctor who conducts image interpretation (image diagnosis) is not present at the location where photography is performed. If this is the case, there is a possibility (risk) that the doctor may be provided with an image that is not suitable for image interpretation. Considering the difficulty of operation and the long length of time required for photographing, it is supposed that this problem is more likely to occur with slit lamp microscopes.

Such telemedicine and screening are considered particularly effective for diseases in which early detection has a significant impact on the course and diseases with a high prevalence. One of such eye diseases is glaucoma. Glaucoma is a major cause of blindness, and its prevalence is known to be about 2% for people in their 40s and about 11% for people in their 70s.

In the diagnosis of glaucoma, anterior eye segment observation is also performed in addition to eye fundus observation (with a fundus camera, SLO, OCT, or the like) and visual field test. A corner angle is the main target of this anterior segment observation, and the condition (or state) of the corner angle is used to identify the cause of disease and make a decision regarding a treatment policy. For example, the condition of the corner angle is used to make a differentiation between closed-angle glaucoma and open-angle glaucoma, and make a selection of a treatment option (e.g., iridotomy, iridectomy, trabeculoplasty, gonioplasty, etc.).

Corner angel observation is typically performed using a gonioscope (goniolens, gonioscopic lens) (see Patent Document 5 listed below, for example). Since a gonioscope is used in contact with the subject's eye, it is necessary to apply an eye drop anesthesia and a corneal protective agent (ophthalmic gel) to the subject's eye, which imposes a burden on the patient.

Patent Document 6 listed below discloses a slit lamp microscope that can be used for corner angle observation. However, since this slit lamp microscope merely provides an image of a single cross section, it cannot provide detailed observation like a gonioscope.

Patent Documents 7 and 8 listed below disclose an OCT apparatus that can be used for corner angle observation. Although an OCT apparatus has an advantage of being capable of performing non-contact imaging of a three dimensional region of the anterior segment, it is difficult to say that the reliability and reproducibility of OCT apparatuses are sufficient because they may not be able to depict a corner angle depending on the condition and/or characteristics of the subject's eye. In addition, considering maintenance and costs, it is considered difficult, at least at present, to widely provide telemedicine, screening, and follow-up observations using an OCT apparatus in place of a slit lamp microscope.

[PATENT DOCUMENT 1] Japanese Unexamined Patent Application Publication No. 2016-159073
[PATENT DOCUMENT 2] Japanese Unexamined Patent Application Publication No. 2016-179004
[PATENT DOCUMENT 3] Japanese Unexamined Patent Application Publication No. 2000-116732
[PATENT DOCUMENT 4] Japanese Unexamined Patent Application Publication No. 2008-284273
[PATENT DOCUMENT 5] Japanese Unexamined Patent Application Publication (Translation of PCT Application) No. 2017-517362
[PATENT DOCUMENT 6] Japanese Unexamined Patent Application Publication No. 2010-042068

[PATENT DOCUMENT 7] Japanese Unexamined Patent Application Publication No. 2014-147501

[PATENT DOCUMENT 8] Japanese Unexamined Patent Application Publication No. 2017-018435

BRIEF SUMMARY

An objective of the present disclosure is to achieve both detailed observation and reliability in non-contact corner angle observation.

A slit lamp microscope of an embodiment example includes a scanner and a memory. The scanner is configured to perform application of a scan with slit light to a three dimensional region including a corner angle of a subject's eye to collect an image group. The memory is configured to store the image group collected by the scanner.

Effect of the Invention

The embodiment example according to the present disclosure is capable of carrying out detailed and reliable observation of a corner angle without bringing the apparatus into contact with the subject's eye.

DETAILED DESCRIPTION

Figure 1:
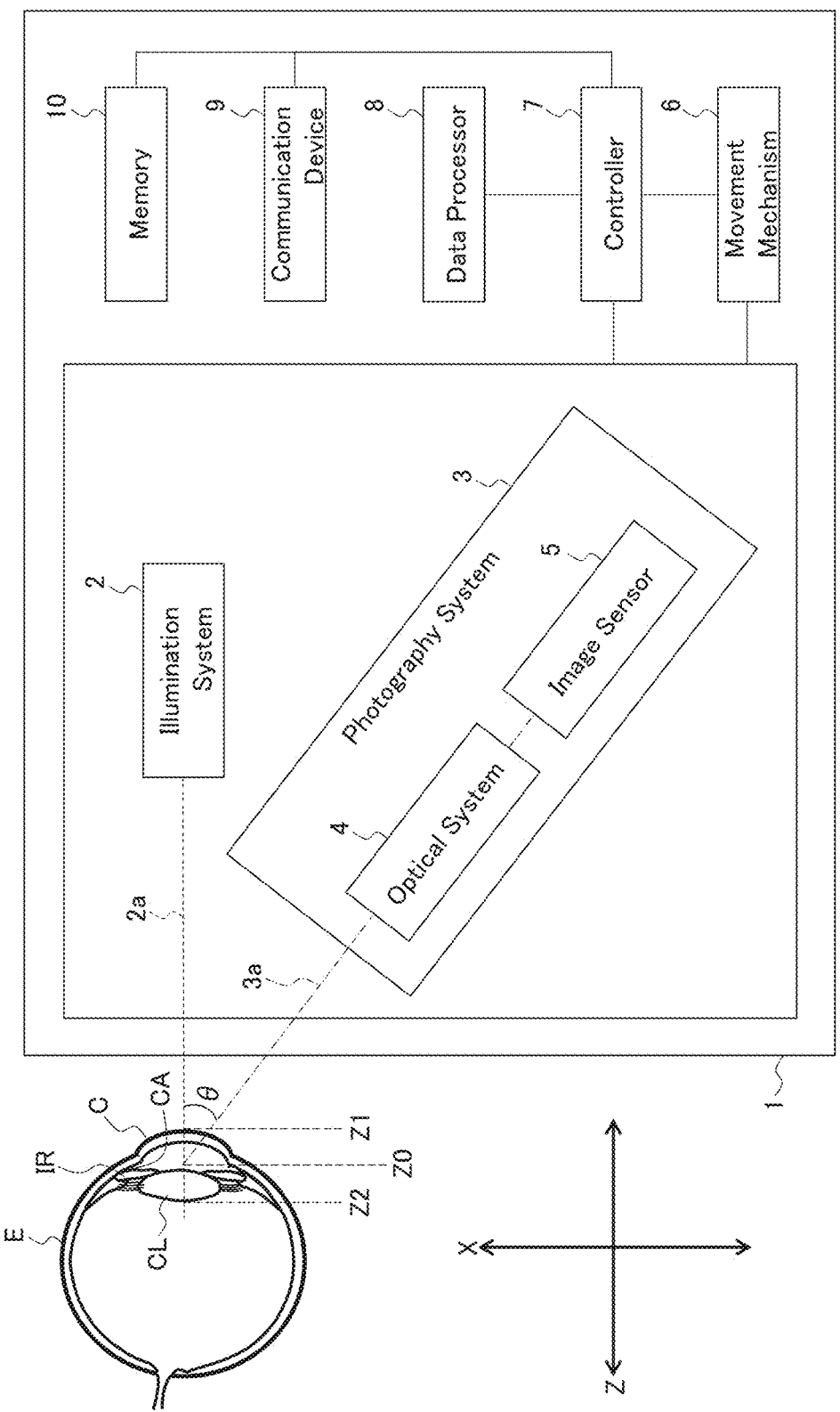
FIG. 1 is a schematic diagram illustrating a configuration of a slit lamp microscope according to an aspect example.

Some aspect examples will be described in detail with referring to the drawings. It should be noted that any known techniques or technologies such as any of the matters or items disclosed in the documents cited herein may be combined with the aspect examples. In addition, the entire disclosures of any of other patent applications filed by the present applicant may be incorporated into the present disclosure. For example, the entire disclosure of any of other patent applications relating to a slit lamp microscope (or relating to a system that includes a slit lamp microscope, or relating to a system connectable to a slit lamp microscope) filed by the present applicant may be incorporated into the present disclosure.

The slit lamp microscope according to some aspect examples may be a stationary type or a portable type. The slit lamp microscope according to some aspect examples is typically used in situations and/or environments where no technical experts (skilled persons) relating to the apparatus is present nearby. Note that the slit lamp microscope according to some aspect examples may be used in situations and/or environments where a skilled person is present, or in situations and/or environments where a skilled person can provide monitoring, give instructions, and/or conduct an apparatus operation, from a remote place. Examples of the facility in which the slit lamp microscope according to some aspect examples is installed include an optician's store, an optometrist's office, a health facility, a medical institution, a health check and screening venue, a patient's home, a welfare facility, a public facility, a medical examination vehicle, and so forth.

The apparatus or system according to some aspect examples has at least the function of a slit lamp microscope, and may further have optional functions such as a photographing or imaging function (modality function) with an apparatus other than a slit lamp microscope, an ocular characteristic measurement function, and an analysis function.

The ophthalmic system according to some aspect examples (first ophthalmic system) may include one or more slit lamp microscopes, one or more information processing apparatuses, and one or more image interpretation computer terminals, and may be used for telemedicine, for example. The slit lamp microscope may be a slit lamp microscope according to any aspect example, or may be a slit lamp microscope including at least part of a slit lamp microscope according to any aspect example. The information processing apparatus is configured to receive an image acquired by the slit lamp microscope and transmit the image to the image interpretation computer terminal. In addition, the information processing apparatus may have a function of managing images acquired by the slit lamp microscope(s). Note that the first ophthalmic system may not include any information processing apparatus and an image may be transmitted from the slit lamp microscope to the image interpretation computer terminal. The image interpretation computer terminal is a computer used by a doctor (typically, a specialist such as an ophthalmologist or a medical image interpreter) to conduct interpretation of an image acquired by the slit lamp microscope. Here, the interpretation is an act of observing an image to obtain medical findings. Information entered into the image interpretation computer terminal by the person who has conducted the image interpretation may, for example, be converted by the image interpretation computer terminal or another computer into an image interpretation report or electronic medical record information and then transmitted to the information processing apparatus. In another example, information entered into the image interpretation computer terminal by a person who conducts image interpretation may be transmitted to the information processing apparatus. In this case, the information processing apparatus or another computer may perform conversion of the information entered by the person who conducts the image interpretation into an image interpretation report or electronic medical record information. The information processing apparatus may be configured to perform management of image interpretation reports or electronic medical record information by itself, or to transfer image interpretation reports or electronic medical record information to another medical system (e.g., an electronic medical record system).

An ophthalmic system according to another aspect example (second ophthalmic system) may include one or more slit lamp microscopes, one or more information processing apparatuses, and one or more image interpretation apparatuses. At least one of the slit lamp microscope and the information processing apparatus may be the same as or similar to that (those) of the first ophthalmic system. The second ophthalmic system may not include any information processing apparatus and an image may be transmitted from the slit lamp microscope to the image interpretation apparatus. The image interpretation apparatus is a computer configured to perform interpretation of an image acquired by the slit lamp microscope, using an artificial intelligence engine (inference engine, inference model, trained model (learned model), etc.) and/or an image processing processor configured to operate according to a predetermined program. Information derived from the image by the image interpretation apparatus may be converted by the image interpretation apparatus or another computer into an image interpretation report or electronic medical record information and then transmitted to the information processing apparatus, for example. In another example, information derived from the image by the image interpretation apparatus may be transmitted to the information processing apparatus. In this case, the information processing apparatus or another computer may convert the information derived from the image by the image interpretation apparatus into an image interpretation report or electronic medical record information. In yet another example, information derived from the image by the image interpretation apparatus and/or information generated based on this information (e.g., image interpretation report, electronic medical record information, etc.) may be provided to a doctor as diagnosis support information.

An ophthalmic system according to yet another aspect example (third ophthalmic system) may include one or more slit lamp microscopes and one or more information processing apparatuses. The slit lamp microscope may be the same as or similar to that of the first ophthalmic system. The information processing apparatus may be the same as or similar to that of the first ophthalmic system and/or that of the second ophthalmic system. In other words, the information processing apparatus may be capable of performing data communication with the image interpretation computer terminal of the first ophthalmic system or a computer similar to this image interpretation computer terminal, and/or, may be capable of performing data communication with the image interpretation apparatus of the second ophthalmic system or a computer similar to this image interpretation apparatus.

The slit lamp microscopes and the ophthalmic systems according to some aspect examples can be used for telemedicine. As mentioned above, acquisition of an eligible image (good image, satisfactory image) using a slit lamp microscope is not an easy task. In addition, effective image interpretation and diagnosis require acquisition of an image of a wide area of an anterior eye segment "in advance". For these reasons, it can be said that effective telemedicine using slit lamp microscopes has not been achieved. Some aspect examples can provide technologies and techniques that contribute to the achievement (realization, implementation) of effective telemedicine with slit lamp microscopes. However, the use of some aspect examples is not limited to telemedicine, and some aspect examples may also be applied to other uses.

The slit lamp microscope according to some aspect examples can be used to acquire a series of images (image group, image set) that represents a wide area of an anterior eye segment with satisfactory image quality. In particular, some aspect examples can be used to acquire a series of images (image group, image set) that represents a wide area of a corner angle with satisfactory image quality. Further, some aspect examples can be used to execute an assessment (observation, analysis, judgment, determination, inference, estimation, etc.) of a corner angle in glaucoma diagnosis, and so forth.

Some aspect examples are also focused on the following problems. Some application modes or implementation modes (e.g., telemedicine) of some aspect examples are operated to provide a series of images (image group, image set) acquired from a sufficiently wide area of an anterior eye segment by a slit lamp microscope directly or indirectly to a person who conducts image interpretation. Therefore, performing re-photographing is difficult even when the quality of a series of images provided is low, thus there is a risk of yielding, as a result, problematic cases such as the following events: image interpretation cannot be conducted at all; or only inadequate image interpretation can be conducted. Accordingly, acquisition of images with "satisfactory" quality "in advance" is required. More specifically, it is desired to collectively acquire a series of images having a quality that enables effective diagnosis (e.g., effective image interpretation) before providing the series of images to a person who conducts image interpretation. However, considering the occurrence of blinking and eye movements during photographing in addition to difficulty of operating slit lamp microscopes, it is extremely difficult to obtain a series of images that represents an entire target area for observation and image interpretation with satisfactory image quality. The present disclosure also considers addressing these issues.

Hereinafter, some aspect examples will be described. Any two or more of these aspect examples may be combined at least in part. Further, any known technique or technology may further be combined with such a combination. In addition, any modifications (e.g., replacements, omissions, etc.) on the basis of any known technique or technology may be applied to such a combination.

At least one or more of the functions of the elements described in the present disclosure are implemented by using a circuit configuration (circuitry) or a processing circuit configuration (processing circuitry). The circuitry or the processing circuitry includes any of the following options, all of which are configured and/or programmed to execute at least one or more functions disclosed herein: a general purpose processor, a dedicated processor, an integrated circuit, a central processing unit (CPU), a graphics processing unit (GPU), an application specific integrated circuit (ASIC), a programmable logic device (e.g., a simple programmable logic device (SPLD), a complex programmable logic device (CPLD), or a field programmable gate array (FPGA)), an existing or conventional circuit configuration or circuitry, and any combination of these. A processor is considered to be processing circuitry or circuitry that includes a transistor and/or another circuitry. In the present disclosure, circuitry, a unit, a means, or a term similar to these is hardware that executes at least one or more functions disclosed herein, or hardware that is programmed to execute at least one or more functions disclosed herein. Hardware may be the hardware disclosed herein, or alternatively, known hardware that is programmed and/or configured to execute at least one or more functions described herein. In the case in which the hardware is a processor, which may be considered as a certain type of circuitry, then circuitry, a unit, a means, or a term similar to these is a combination of hardware and software. In this case, the software is used to configure the hardware and/or the processor.

FIG. 1 shows an example of the slit lamp microscope according to an aspect example. The slit lamp microscope 1 is used for photographing the anterior segment of the subject's eye E. In FIG. 1, the cornea of the subject's eye E is denoted by the reference character C, the crystalline lens is denoted by the reference character CL, the iris is denoted by the reference character IR, and the corner angle is denoted by the reference character CA. The corner angle CA is a site located between the cornea C and the iris IR and is also referred to as an anterior chamber corner angle.

The corner angle area contains an outlet for aqueous humor. This outlet is referred to as Schlemm's canal. Narrowing of the corner angle can impede the outflow of aqueous humor and increase intraocular pressure, which can lead to glaucoma. Complete occlusion of the corner angle can cause an acute glaucoma attack with a sudden increase in intraocular pressure. The slit lamp microscope 1 can be used for corner angle observation, and in particular, can be used for photographing a three dimensional region that includes the corner angle.

The slit lamp microscope 1 includes the illumination system 2, the photography system 3, the movement mechanism 6, the controller 7, the data processor 8, the communication device 9, and the memory 10. The slit lamp microscope 1 may be a single apparatus, or may also be a system that includes two or more apparatuses. In the case where the slit lamp microscope 1 is configured as a system, the slit lamp microscope 1 may include a main apparatus, a computer, and a communication interface. Here, the main apparatus may include the illumination system 2, the photography system 3, and the movement mechanism 6, the computer may include the controller 7, the data processor 8, and the communication device 9, and the communication interface may perform data communication between the main apparatus and the computer. This computer may be installed together with the main apparatus, for example, or may also be installed on a network.

<Illumination System 2>

The illumination system 2 projects slit light onto the anterior segment of the subject's eye E (in particular, the three dimensional region that includes the corner angle CA). The reference character 2a denotes the optical axis of the illumination system 2 that is referred to as the illumination optical axis. The illumination system 2 may have the same or similar configuration as or to the illumination system of a conventional slit lamp microscope. An example of the illumination system 2 includes an illumination light source, a positive lens, a slit forming member, and an objective lens in the order from the side far from the subject's eye E (not shown in the drawings).

The illumination light source outputs (emits) illumination light. The illumination system 2 may include a plurality of illumination light sources. For example, the illumination system 2 may include both an illumination light source that outputs continuous light or steady light, and an illumination light source that outputs flash light. Further, the illumination system 2 may include both an illumination light source for anterior segment illumination and an illumination light source for posterior segment illumination. Furthermore, the illumination system 2 may include two or more illumination light sources with mutually different output wavelengths. A typical example of the illumination system 2 includes a visible light source as an illumination light source. The illumination system 2 may also include an infrared light source. The illumination light output from the illumination light source passes through the positive lens and is projected onto the slit forming member.

The slit forming member passes a part of the illumination light to generate slit light. A typical example of the slit forming member has a pair of slit blades. The width of the region through which the illumination light passes is changed by changing the interval between the slit blades, and the width of the slit light is changed accordingly. The region through which the illumination light passes is referred to as a slit, and the interval between the slit blades is referred to as a slit width. Further, the slit forming member may be configured to be capable of changing the length of the slit light. The length of the slit light is a size of a cross section of the slit light along the direction orthogonal to the cross sectional width direction of the slit light. Here, the cross sectional width direction corresponds to the slit width. The width of the slit light and the length of the slit light of some typical examples are represented as the size (dimensions) of a projected image on the anterior segment formed by the slit light; however, possible representations of the width and length of the slit light are not limited to these examples. For example, the width of the slit light and the length of the slit light may be represented as the size of the cross section of the slit light at a freely selected or determined position, or as the size of the slit formed by the slit forming member.

The slit light generated by the slit forming member is refracted by the objective lens and is projected onto the anterior segment of the subject's eye E.

The illumination system 2 may further include a focus mechanism configured for changing the focal position of the slit light. The focus mechanism may be configured to move the objective lens along the illumination optical axis 2a, for example. The movement of the objective lens may be carried out automatically and/or manually. Another focus mechanism may be configured to change the focal position of the slit light by: preparing and disposing a focusing lens at a position in the illumination optical axis 2a between the objective lens and the slit forming member; and moving the focusing lens along the illumination optical axis 2a.

Note that FIG. 1 is a top view. As shown in FIG. 1, the direction along the axis of the subject's eye E is defined as the Z direction in the present aspect example. Of the directions orthogonal to the Z direction, the left-right direction (or, the lateral direction) for the subject is defined as the X direction. The direction orthogonal to both the X direction and the Z direction is defined as the Y direction. In some typical examples, the X direction is the direction from one of the left eye and the right eye toward the other, and the Y direction is the direction parallel to the body axis of the subject (body axis direction).

<Photography system 3>

The photography system 3 is configured to perform photography of the anterior segment (in particular, the three dimensional region that includes the corner angle CA) while the slit light from the illumination system 2 is being projected onto the anterior segment. The reference character 3a denotes the optical axis of the photography system 3 that is referred to as the photography optical axis. The photography system 3 of the present aspect example includes the optical system 4 and the image sensor 5.

The optical system 4 is configured to direct light coming from the anterior segment of the subject's eye E onto which the slit light is being projected, to the image sensor 5. The image sensor 5 includes a light detecting plane that receives the light directed by the optical system 4.

The light directed by the optical system 4, that is, the light coming from the anterior segment of the subject's eye E, contains return light of the slit light being projected onto the anterior segment, and may further contain other kinds of light. Examples of the return light include reflected light of the slit light, scattered light of the slit light, and fluorescence induced by the slit light. Examples of the other kinds of light include light from the environment in which the slit lamp microscope 1 is installed, such as indoor light (room light) and sunlight. In the case where another illumination system different from the illumination system 2 is provided as an anterior segment illumination system for illuminating the entire anterior segment, return light of the anterior segment illumination light emitted by the anterior segment illumination system may be contained in the light directed by the optical system 4.

The image sensor 5 may be an area sensor that has a two dimensional image detecting area. The image sensor 5 may be, for example, a charge-coupled device (CCD) image sensor, a complementary metal oxide semiconductor (CMOS) image sensor, or another type of image sensor.

The optical system 4 may have, for example, the same or similar configuration as or to the photography system of a conventional slit lamp microscope. For example, the optical system 4 includes an objective lens, a variable magnification optical system, and an imaging lens in the order from the side closer to the subject's eye E. The light coming from the anterior segment of the subject's eye E onto which the slit light is being projected, passes through the objective lens and the variable magnification optical system, and then forms an image on the light detecting plane of the image sensor 5 by the imaging lens.

The photography system 3 may further include a focus mechanism configured for changing the focal position of the photography system 3. The focus mechanism may be configured to move the objective lens along the photography optical axis 3a, for example. The movement of the objective lens may be carried out automatically and/or manually. Note that a focusing lens may be prepared and disposed at a position in the photography optical axis 3a between the objective lens and the imaging lens, and also the focus mechanism may be capable of moving the focusing lens along the photography optical axis 3a, thereby changing the focal position of the photography system 3.

The illumination system 2 and the photography system 3 function as a Scheimpflug camera. More specifically, the illumination system 2 and the photography system 3 are configured in such a manner that the subject plane along the illumination optical axis 2a, the optical system 4, and the light detecting plane of the image sensor 5 satisfy what is commonly referred to as the Scheimpflug condition. More specifically, the YZ plane passing through the illumination optical axis 2a (the YZ plane contains the subject plane), the principal plane of the optical system 4, and the light detecting plane of the image sensor 5 intersect on the same straight line. As a result of this, photographing can be performed with all positions in the subject plane in focus. In other words, photographing can be performed with all positions in the direction along the illumination optical axis 2a in focus.

In the present aspect example, photography is performed under the condition in which a three dimensional region that includes the corner angle CA is in focus of the photography system 3, for example. As for the z direction, for example, photography may be performed under the condition in which the focus of the photography system 3 is on the entire area from the apex of the anterior surface of the cornea C (Z=Z1) to the apex of the posterior surface of the crystalline lens CL (Z=Z2). Note that the location Z=Z0 corresponds to the Z coordinate of the intersection of the illumination optical axis 2a and the photography optical axis 3a.

The condition described above is typically implemented by the configuration and arrangement of the elements included in the illumination system 2, the configuration and arrangement of the elements included in the photography system 3, and the relative positions between the illumination system 2 and the photography system 3. A parameter indicating the relative positions of the illumination system 2 and the photography system 3 may include the angle θ formed by the illumination optical axis 2a and the photography optical axis 3a, for example. The value of the angle θ may be set to 17.5 degrees, 30 degrees, or 45 degrees, for example. The angle θ may be variable.

<Movement mechanism 6>

The movement mechanism 6 is configured to move the illumination system 2 and the photography system 3. The movement mechanism 6 includes, for example, a movable stage, an actuator, and a mechanism. The illumination system 2 and the photography system 3 are placed on the movable stage. The actuator is configured to operate in accordance with a control signal input from the controller 7. The mechanism is configured to receive driving force generated by the actuator and move the movable stage. In another example, the movement mechanism 6 may include a movable stage on which the illumination system 2 and the photography system 3 are placed, and a mechanism configured to receive force applied to an operation device (not shown in the drawings) and move the movable stage. The operation device is a lever, for example. The movable stage may be movable at least in the X direction and may be further movable in at least one of the Y direction and the Z direction.

The movement mechanism 6 of the present aspect example is configured to move the illumination system 2 and the photography system 3 together with each other in the X direction, for example. In other words, the movement mechanism 6 moves the illumination system 2 and the photography system 3 in the X direction while maintaining the state in which the above-mentioned Scheimpflug condition is satisfied. In parallel with this movement, the photography system 3 performs moving image photography at a predetermined time interval (photographing rate, acquisition rate), for example. As a result of this, a three dimensional region of the anterior segment of the subject's eye E is scanned with the slit light, and a plurality of images (an image group) corresponding to the plurality of cross sections in the three dimensional region are collected.

In some typical examples, the longitudinal direction (length direction) of the slit light projected onto the anterior segment by the illumination system 2 matches the Y direction, and the lateral direction (width direction) thereof matches the X direction. Further, the movement mechanism 6 is operated to move the illumination system 2 and the photography system 3 together with each other in the X direction. In other words, the movement mechanism 6 moves the illumination system 2 and the photography system 3 in such a manner that the slit light projected onto the anterior segment by the illumination system 2 moves in the width direction of the slit light. This makes it possible to simply and efficiently scan the three dimensional region of the anterior segment. Note that the combination of the orientation of the slit light and the direction of movement may be freely determined.

<Controller 7>

The controller 7 is configured to control each part of the slit lamp microscope 1. For example, the controller 7 controls elements of the illumination system 2 (e.g., illumination light source, slit forming member, focus mechanism, etc.), elements of the photography system 3 (e.g., focus mechanism, image sensor, etc.), the movement mechanism 6, the data processor 8, and the communication device 9, and so forth. Further, the controller 7 may be capable of executing a control for changing the relative positions of the illumination system 2 and the photography system 3.

The controller 7 includes a processor, a primary storage, a secondary storage, and so forth. The secondary storage retains a control program and so forth. The control program and so forth may be stored in a computer or a storage accessible by the slit lamp microscope 1. The function of the controller 7 is implemented by cooperation of software such as the control program and hardware such as the processor.

The controller 7 may be capable of applying the following controls to the illumination system 2, the photography system 3 and the movement mechanism 6 in order to scan a three dimensional region of the anterior segment of the subject's eye E with the slit light.

First, the controller 7 controls the movement mechanism 6 to place the illumination system 2 and the photography system 3 at a predetermined scan start position. This control is referred to as an alignment control. The scan start position is, for example, a position corresponding to the edge position (first edge position) of the cornea C in the X direction, or a position further away from the axis of the subject's eye E than the first edge position.

Figure 2A:
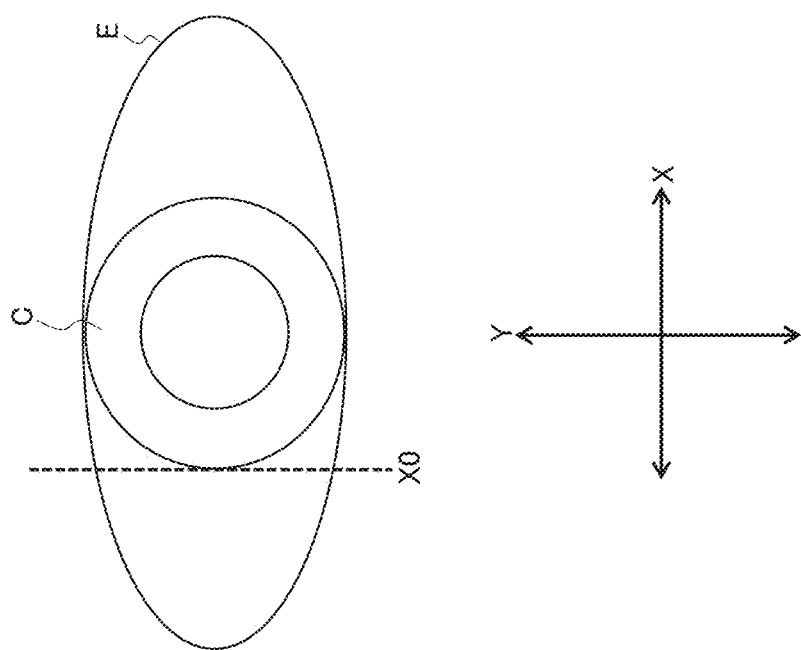
FIG. 2A is a schematic diagram for describing an operation of a slit lamp microscope according to an aspect example.

The reference character X0 shown in FIG. 2A denotes an example of a scan start position corresponding to the first edge position of the cornea C in the X direction. The scan start position X0 substantially corresponds to the position of the corner angle CA, and a scan that starts from the scan start position X0 is applied to a three dimensional region including the corner angle CA.

Figure 2B:
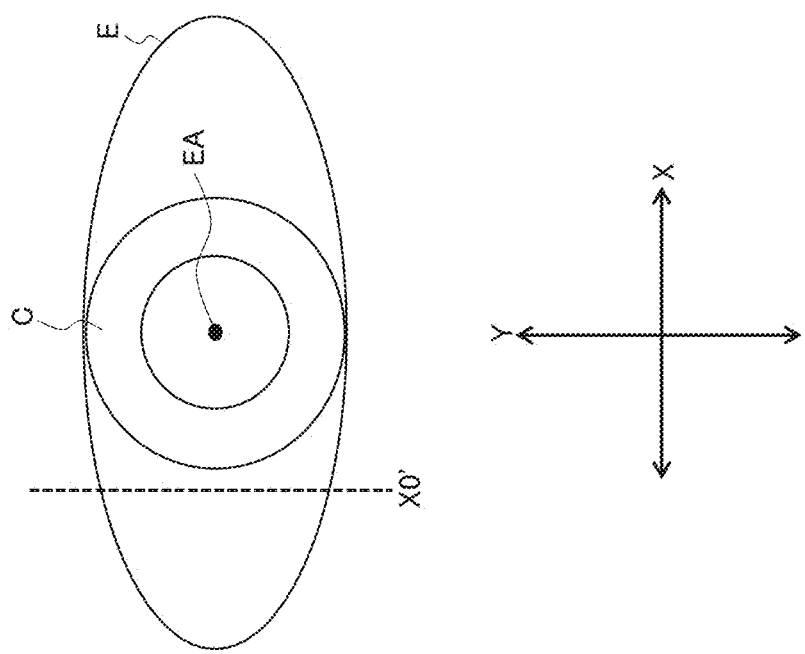
FIG. 2B is a schematic diagram for describing an operation of a slit lamp microscope according to an aspect example.

The reference character X0' shown in FIG. 2B denotes an example of a scan start position further away from the axis EA of the subject's eye E than the position corresponding to the first edge position of the cornea C in the X direction. The scan start position X0' corresponds to a position outside the corner angle CA, and a scan that starts from the scan start position X0' is applied to a three dimensional region including the corner angle CA.

The controller 7 controls the illumination system 2 to start the projection of the slit light onto the anterior segment of subject's eye E. This control is referred to as slit light projection control. The slit light projection control may be performed before the execution of the alignment control or during the execution of the alignment control. The slit light is typically continuous light, but the slit light may be intermittent light (pulse light). The turning on/off control of the pulse light is synchronized with the photographing rate of the photography system 3. The slit light is typically visible light, but the slit light may be infrared light or a mixture of visible light and infrared light.

The controller 7 controls the photography system 3 to start moving image photography (moving image acquisition) of the anterior segment of the subject's eye E. This control is referred to as photography control. The photography control may be performed before the execution of the alignment control or during the execution of the alignment control. In some typical examples, the photography control is executed simultaneously with the slit light projection control or after the slit light projection control.

After having executed the alignment control, the slit light projection control, and the photography control, the controller 7 performs a control of the movement mechanism 6 to start the movement of the illumination system 2 and the photography system 3. This control is referred to as movement control. The illumination system 2 and the photography system 3 are moved together by the movement control. In other words, the movement mechanism 6 moves the illumination system 2 and the photography system 3 while maintaining the relative positions (e.g., the angle θ) between the illumination system 2 and the photography system 3. In some typical examples, the movement mechanism 6 moves the illumination system 2 and the photography system 3 while maintaining the state in which the aforementioned Scheimpflug condition is satisfied. The movement of the illumination system 2 and the photography system 3 is performed from the aforementioned scan start position to a predetermined scan end position. The scan end position is, for example, a position corresponding to the edge position (second edge position) of the cornea C on the opposite side of the first edge position in the X direction, or a position further away from the axis of the subject's eye E than the second edge position, as in the scan start position. In such a case, the area from the scan start position to the scan end position becomes a scan area. In either case, the scan is applied to a three dimensional region that includes the corner angle CA on the side of the first edge position of the cornea C and the corner angle CA on the side of the second edge position of the cornea C.

In some typical examples, the photography system 3 carries out the moving image photography in parallel with the projection of the slit light onto the anterior segment and the movement of the illumination system 2 and the photography system 3 in the X direction. Here, the width direction of the slit light corresponds to the X direction and the longitudinal direction of the slit light corresponds to the Y direction.

Here, the length of the slit light (that is, the size of the slit light in the Y direction) is set to be, for example, equal to or greater than the diameter of the cornea C on the surface of the subject's eye E. In other words, the length of the slit light is set to be equal to or greater than the corneal diameter in the Y direction. Further, the distance of the movement of the illumination system 2 and the photography system 3 carried out by the movement mechanism 6 (that is, scan area) is set to be equal to or greater than the corneal diameter in the X direction, as described above. As a result of setting the slit light length and the movement distance in these manners, an area including the entire cornea C can be scanned with the slit light. In other words, the scan can be applied to a three dimensional region that includes the entire corner angle CA.

Figure 3:
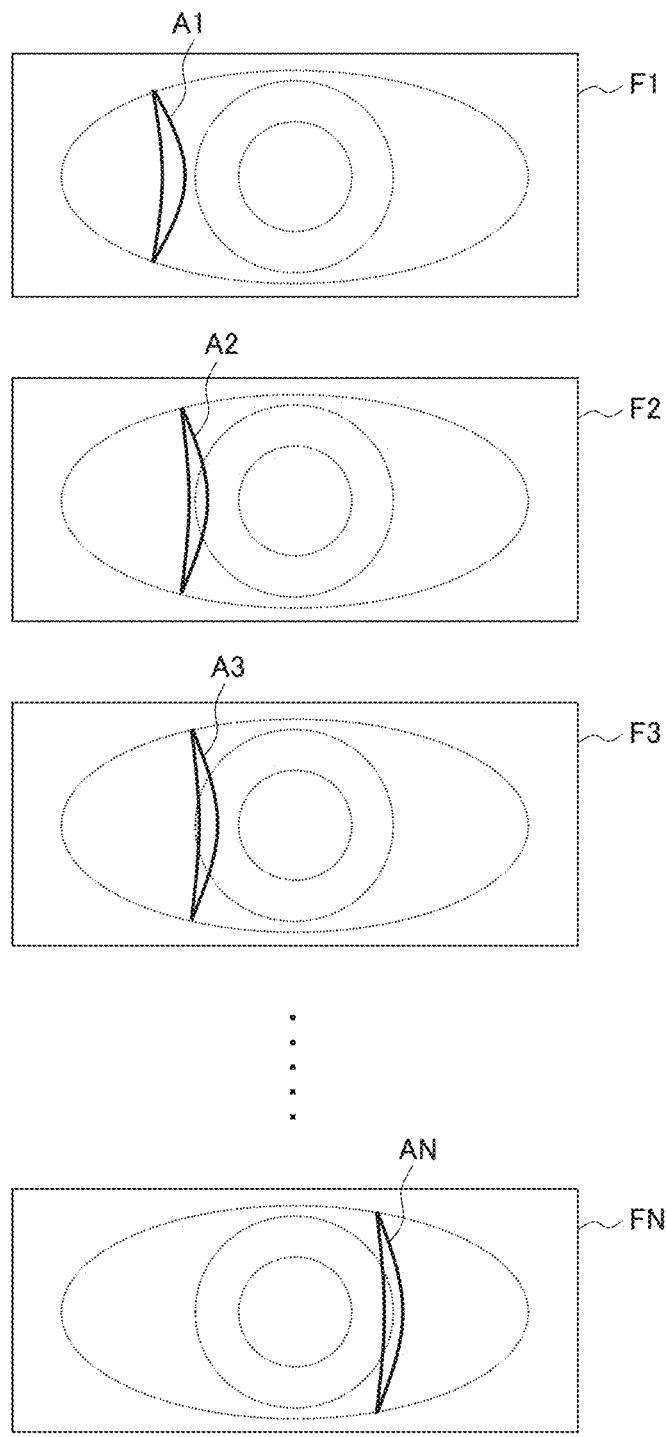
FIG. 3 is a schematic diagram for describing an operation of a slit lamp microscope according to an aspect example.

By performing such a scan, a plurality of anterior segment images corresponding to mutually different slit light projection positions is acquired. In other words, a moving image is obtained in which the state (aspect) of the movement of the slit light projection position in the X direction is depicted. FIG. 3 shows an example of such a plurality of anterior segment images, that is, an example of such a group of frames (a frame group) composing a moving image.

FIG. 3 shows the plurality of anterior segment images (the frame group, the image group) F1, F2, F3, . . . , and FN. The subscripts "n" of the anterior segment images Fn (n=1, 2, . . . , N) represent a time series order. In other words, the n-th anterior segment image acquired is represented by the reference character "Fn". The anterior segment image Fn includes the region onto which the slit light is being projected (slit light projected region) An. As shown in FIG. 3, the positions of the slit light projected regions A1, A2, A3, . . . , and AN shift to the right in time series order. In the example shown in FIG. 3, the longitudinal direction (length direction) of the slit light matches the Y direction (vertical direction, body axis direction), the lateral direction (width direction) matches the X direction (left-right direction, horizontal direction), and the moving direction of the slit light matches the X direction. In addition, the scan start position is a position outside (left side) of the first edge position (left edge) of the cornea C, and the scan end position is a position outside (right side) of the second edge position (right edge) of the cornea C. According to the scanning of this mode, a three dimensional region that includes the entire cornea C and the entire corner angle CA can be photographed. Note that possible scan start positions and/or possible scan end positions are not limited to those in the present example. In some examples, the scan start position and/or the scan end position may be the edge position(s) of the cornea C in the X direction. Various kinds of scan parameters, such as the orientation of the slit light, the movement direction of the scan light, and the number of times of scans, can also be freely determined.

<Data processor 8>

The data processor 8 executes various kinds of data processing. Data to be processed may be either any data acquired by the slit lamp microscope 1 or any data input from the outside. The data processor 8 can process images acquired by using the photography system 3. For example, the data processor 8 can apply predetermined processing to at least one or more images of the image group Fn collected by a scan of the mode shown in FIG. 3. The data processor 8 can also apply predetermined processing to at least one or more images of the image group collected by a scan of any different mode. Note that the configuration examples and the function examples of the data processor 8 will also be described in other aspect examples in addition to the description of the present aspect example.

The data processor 8 includes a processor, a primary storage, a secondary storage, and so forth. The secondary storage retains a data processing program and so forth. The data processing program and so forth may include a model constructed by machine learning (learned model, inference model, etc.). The data processing program and so forth may be stored in a computer or a storage accessible by the slit lamp microscope 1. The function of the data processor 8 is implemented by cooperation of software such as the data processing program and hardware such as the processor.

Figure 4A:
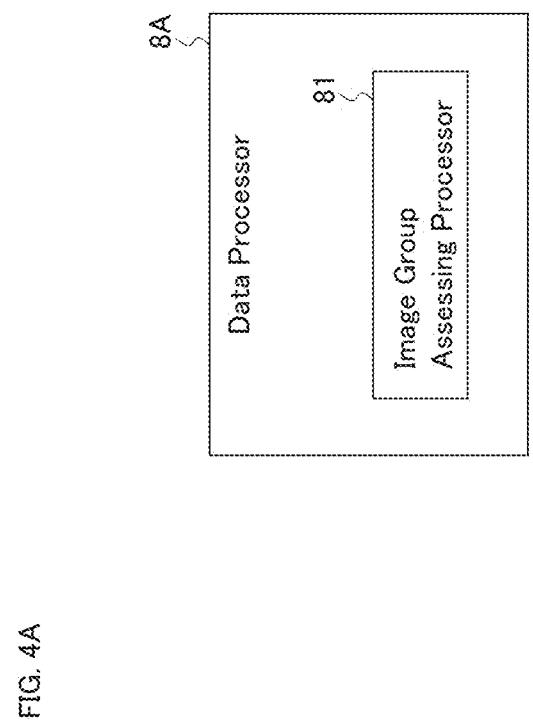
FIG. 4A is a schematic diagram illustrating a configuration of a slit lamp microscope according to an aspect example.
Figure 4B:
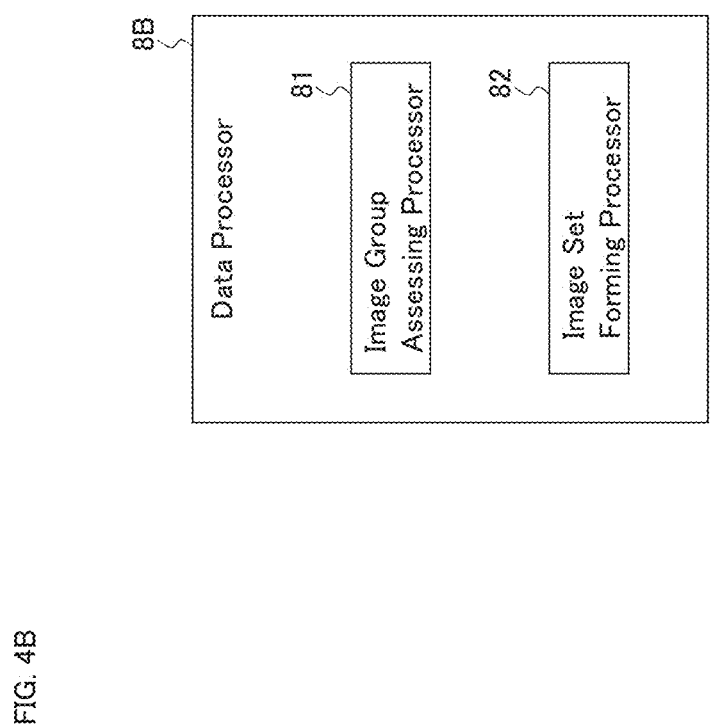
FIG. 4B is a schematic diagram illustrating a configuration of a slit lamp microscope according to an aspect example.
Figure 4C:
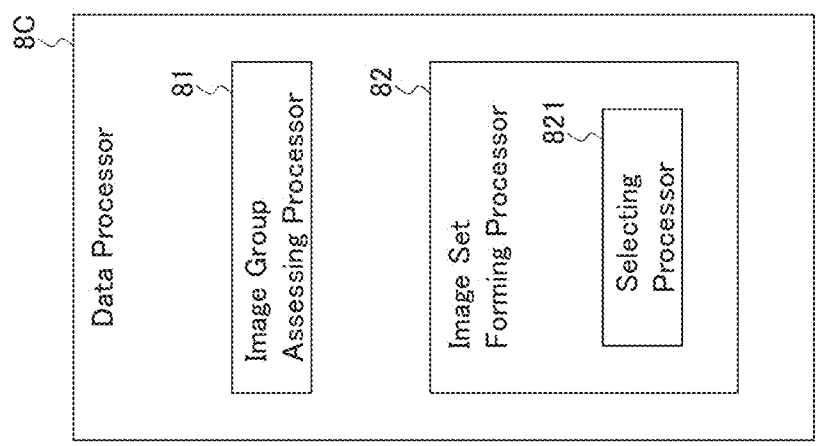
FIG. 4C is a schematic diagram illustrating a configuration of a slit lamp microscope according to an aspect example.
Figure 4D:
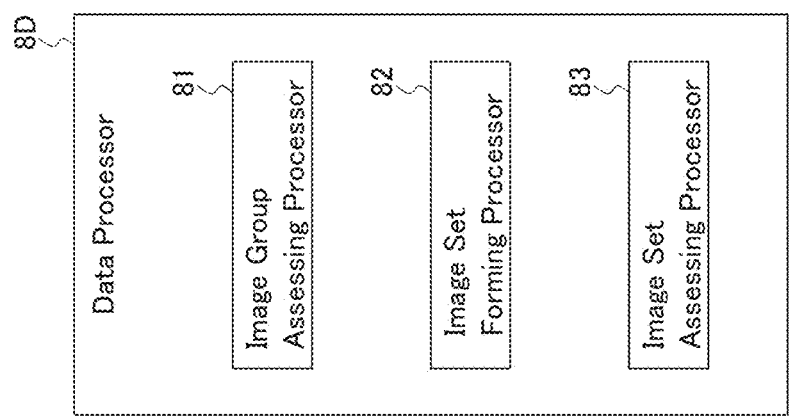
FIG. 4D is a schematic diagram illustrating a configuration of a slit lamp microscope according to an aspect example.

Some examples of the data processor 8 will be described. The data processor 8A shown in FIG. 4A, the data processor 8B shown in FIG. 4B, the data processor 8C shown in FIG. 4C, and the data processor 8D shown in FIG. 4D are the first, second, third, and forth examples of the data processor 8, respectively. Possible configurations of the data processor 8 are not limited to these examples. For example, the data processor 8 may include a combination of any two or more of the four data processors 8A, 8B, 8C, and 8D. The data processor 8 may also be provided with any element configured for obtaining the same or similar types of results.

The slit lamp microscope 1 of the present aspect example applies one or more times of scans to the subject's eye E (the three dimensional region that includes the corner angle CA). Each scan generates an image group like the plurality of anterior segment images F1 to FN shown in FIG. 3. The data processor 8 may apply processing to one or more image groups acquired in this way.

The slit lamp microscope 1 may be capable of applying two or more times of scans to the anterior segment. For example, in the case where the first scan (the scan of the first time) does not yield a satisfactory image group, the second scan (the scan of the second time) is performed. More generally, in the case where all the first to the v-th scans (the scan of the v-th time) do not yield a satisfactory series of images, the (v+1)-th scan (the scan of the (v+1)-th time) is then performed (where v is an integer equal to or greater than 1). In some aspect examples, in the case where no satisfactory series of images (image set) is obtained from the v number of (pieces of) image groups acquired from the v number of (times of) scans of the first to the v-th scans, the (v+1)-th scan is then performed. In some other aspect examples, in the case where none of the v number of image groups acquired from the v number of scans of the first to the v-th scans is a satisfactory image set, the (v+1)-th scan is then performed. Note that the manner of conducting two or more times of scans is not limited to these example cases.

In the case where the slit lamp microscope 1 performs two or more times of scans, the start positions and the end positions (that is, scan areas) of the two or more times of scans may be the same, or one of or both the start positions and the end positions may be different. The two or more times of scans of some typical examples are aimed at the same scan area. Such scans acquire image groups, each of which is like the plurality of anterior segment images F1 to FN shown in FIG. 3. The number of the acquired image groups is equal to the number of scans.

Considering the eye movements of the subject's eye E and so forth, the scan area of some typical examples (scan start position, scan end position) is defined by the operation of the slit lamp microscope 1 rather than positions or area in an anterior eye segment. For example, the start point of the movement of the illumination system 2 and the photography system 3 for a scan is determined to be a scan start position, and the end point of the movement of the illumination system 2 and the photography system 3 for a scan is determined to be a scan end position.

On the other hand, a scan area may be defined by positions or area in the anterior segment. In this case, the illumination system 2 and the photography system 3 are moved to follow the movement of the subject's eye E. This operation is referred to as tracking. The slit lamp microscope 1 of the present example has, for example, the same or similar tracking function as or to that of a conventional slit lamp microscope. The tracking function includes, for example, the following processes: a process of performing moving image photography of an anterior eye segment; a process of extracting a landmark from each frame; a process of calculating displacements (position shifts, positional differences, positional deviations) between frames using the landmarks; and a process of performing a movement control of the illumination system 2 and the photography system 3 to compensate for (to cancel, to eliminate) the displacements.

As another example of the definition (setting) of a scan area, a scan area may be set for images that have already been collected. In other words, setting of a scan area may be performed after scanning. A scan area in the present example is an area corresponding to images to be provided for subsequent processing.

A description will be given of the first example of such scan area determination after scanning. The slit lamp microscope of the present example is capable of performing anterior eye segment photography and recognizing the positional relationship between the optical system for anterior eye segment photography and the optical system for scanning (the illumination system 2 and the photography system 3). The present example begins with anterior eye segment photography, in parallel with acquisition of an image group (wide area image group) by scanning a sufficiently wide area of the anterior eye segment (particularly, sufficiently wide ranges in the X direction and the Y direction). Next, a scan area is determined for anterior segment images obtained by this anterior eye segment photography. This determination may be made manually or automatically. Automatic determination may include, for example, a process of analyzing an anterior segment image to detect a landmark (e.g., a corneal edge, a corner angle, or a pupil edge) and a process of determining a scan area with reference to the landmark. After the scan area determination, a partial area of each wide area image corresponding to the determined scan area is identified based on the positional relationship between the optical systems described above. Finally, by cropping the identified partial area from the wide area image, an image corresponding to the scan area is formed. With such processes, an image group corresponding to the determined scan area is obtained. When the fixation of the subject's eye is stable (or, when it is or can be assumed as such), anterior eye segment photography of the present example may be still image photography. When anterior eye segment photography of the present example is moving image photography, for example, association (correspondence, relationship) between a wide area image group and a frame group in the moving image is made based on control executed for scanning and moving image photography, such as based on synchronization information between scanning and moving image photography, and the same or similar processing as or to the above is executed for each pair of a wide area image and a frame associated with one another by the association.

The second example of scan area determination after scanning will be described. The present example does not require parallel anterior eye segment photography, and scans a sufficiently wide area of the anterior eye segment (particularly, sufficiently wide ranges in the X direction and the Y direction) to collect a wide area image group. Then, a partial area corresponding to a desired scan area is designated for each wide area image. This designation may be made manually or automatically. Automatic designation may include, for example, a process of analyzing a wide area image to detect a landmark (e.g., a corneal edge or a corner angle) and a process of determining a scan area with reference to the landmark. A landmark may be manually designated for one of the wide area images. This wide area image for which a landmark is designated is referred to as a reference wide area image. Then, the reference wide area image and a wide area image adjacent to the reference wide area image (adjacent wide area image) may be analyzed to designate a landmark for this adjacent wide area image. Sequential application of such processes gives landmarks for all the wide area images. Furthermore, partial areas of the wide area images corresponding to the scan area may be identified based on the landmarks, and images corresponding to the scan area may be obtained by cropping the identified partial areas from the respective wide area images. As a result of this, an image group corresponding to the determined scan area is obtained.

A description will be given of the first example of the data processor 8. The data processor 8A shown in FIG. 4A includes the image group assessing processor 81. The image group assessing processor 81 is configured to execute an assessment of a quality of an image group collected by a single scan of the subject's eye E (the three dimensional region that includes the corner angle CA). In some aspect examples, the image group assessing processor 81 is configured to determine whether or not the image group satisfies a predetermined condition. In typical examples, the image group assessing processor 81 is configured to determine whether or not each image included in the image group satisfies a predetermined condition.

This predetermined condition (referred to as an image group assessment condition) is, for example, a condition relating to image quality required for effective performance of image interpretation and diagnosis. Examples of the image group assessment condition include a condition relating to the subject's eye E, a condition relating to the slit lamp microscope 1, a condition relating to the environment, and so forth. The image group assessment condition may include, for example, either one of or both the following condition items: a condition that an image to be assessed has not been affected by blinking (referred to as a blinking condition); and a condition that an image to be assessed has not been affected by eye movement (referred to as an eye movement condition). Further, the image group assessment condition may include any indicator relating to any image quality assessment and may include any of the following indicators: brightness; contrast; noise; signal-to-noise ratio (SNR); tone reproduction; dynamic range; sharpness; vignetting; aberrations (spherical aberration, astigmatism, comatic aberration, field curvature, distortion, chromatic aberration, etc.); color accuracy; exposure accuracy; lens flare; moire patterns; and artifacts. Possible image group assessment conditions are not limited to these examples, and may be determined and prepared optionally.

A description will be given of the blinking condition. For an image included in the image group, the image group assessing processor 81 performs determination whether or not a reflected image of the slit light projected onto the anterior segment of the subject's eye E is included in this image, for example. This determination is data processing carried out on the basis of a fact that a reflected image of the slit light is not depicted in an image taken during blinking and a fact that a reflected image of the slit light is represented significantly brighter than other areas. The determination is carried out, for example, based on the brightness distribution in an image being processed.

In some aspect examples, the image group assessing processor 81 generates a brightness histogram based on an image and then determines whether or not there is a pixel having brightness equal to or greater than a predetermined threshold value. When the image group assessing processor 81 determines that there is a pixel having brightness equal to or greater than the predetermined threshold value, it is determined that a reflected image of the slit light is included in this image. The present example has an advantage of being extremely simple to process, but it may falsely detect a high-brightness noise or a reflection of environment light (ambient light).

In some other aspect examples, the image group assessing processor 81 generates a brightness histogram based on an image and then determines whether or not there are a predetermined number or more of pixels having brightness equal to or greater than a predetermined threshold value. When the image group assessing processor 81 determines that the number of pixels having brightness equal to or greater than the predetermined threshold value is equal to or greater than the predetermined number, it is determined that a reflected image of the slit light is included in this image. The present example has an advantage that the above false detection can be prevented by simple processes as described above.

A description will be given of the eye movement condition. For an image included in the image group, the image group assessing processor 81 performs determination whether or not eye movement has affected this image by comparing this image with an image adjacent thereto, for example. This determination is data processing carried out on the basis of a fact that eye movement during moving image photography causes "skipping (lack, omission) of an image".

In some aspect examples, the image group assessing processor 81 detects a landmark from each of this image and the adjacent image, calculates the amounts of displacements (position shifts, positional differences, positional deviations) of the detected landmarks, and determines whether or not each of the displacement amounts calculated is equal to or greater than a predetermined threshold value. When the image group assessing processor 81 determines that the displacement amount(s) is equal to or greater than the predetermined threshold value, it is determined that eye movement has occurred. Here, the landmark may be, for example, a cornea, an iris, a pupil, a corner angle, or the like. The threshold value may be calculated based on a predetermined scanning condition such as the photographing rate of the photography system 3, the movement speed of the photography system 3 carried out by the movement mechanism 6, or the like.

In some other aspect examples, the image group assessing processor 81 may be configured to determine the presence or absence of eye movement from a single image. For example, when the photographing rate of the photography system 3 is low and high-speed eye movement occurs, "blurring" may occur in an image obtained. The image group assessing processor 81 may be configured to determine the presence or absence of eye movement by using a blur detection technique. Blur detection of some typical examples is performed using any known techniques such as edge detection.

The image group assessing processor 81 may include an artificial intelligence engine configured to determine whether or not an input image satisfies the image group assessment condition described above. In some typical examples, this artificial intelligence engine includes a convolutional neural network (CNN). This convolutional neural network has been trained in advance using training data. This training data may include a large number of images acquired with slit lamp microscopes and corresponding determination results of whether or not each of these images satisfies the image group assessment condition. Note that images included in the training data are not limited to images acquired with slit lamp microscopes. In some examples, any of the following images may be included in training data: an image acquired using other kinds of ophthalmic modalities (e.g., fundus camera, OCT apparatus, SLO, surgical microscope); an image acquired using any kinds of diagnostic imaging modalities of any clinical departments other than ophthalmology (e.g., ultrasonic diagnostic apparatus, X-ray diagnostic apparatus, X-ray computed tomography (CT) apparatus, magnetic resonance imaging (MRI) apparatus); an image generated by processing an actual image (image acquired from a living body); and a pseudo image. Further, the method and technique used in the artificial intelligence engine may be freely selected from among any known method and technique. For example, the type of hardware, the type of software, the type of machine learning method, and the type of neural network may be freely designed based on any known method and technique.

A series of images composing an image group collected by a single scan may be associated with a plurality of positions (a plurality of locations) in the scan area. This association is performed by the data processor 8, for example. A specific example will be explained. The scan area along the X direction is divided into the N-1 number of sections (intervals), the scan start position is determined at the first position, and the scan end position is determined at the N-th position. Here, N is an integer equal to or greater than 2. As a result, the N number of positions are determined in the scan area. The N number of positions are represented by B1, B2, B3, . . . , BN (not shown in the drawings). The intervals between the N number of positions B1 to BN may be equal or different. The number (N) of positions B1 to BN is determined based, for example, on the scan start position, the scan end position, the movement speed of the slit light (scan speed), the frame rate of the photography system 3, and so forth. The number (N) of positions B1 to BN determined in the present example is equal to the number of images collected by a single scan. Note that possible number (N) of positions B1 to BN is not limited to the present example, nor is possible method of determining thereof limited to the present example. It is now considered a case in which application of a single scan to the anterior segment of the subject's eye E has generated the image groups F1, F2, F3, . . . , FN shown in FIG. 3. The data processor 8 may assign the image Fn to the position Bn. As a result of this, the N number of images Fn (n=1, 2, . . . , N) respectively corresponding to the N number of positions Bn (n=1, 2, . . . , N) can be obtained.

An image group of some examples may include only such a series of images, or may include other information in addition to the series of images. Examples of information that may be included in an image group together with a series of images include various kinds of supplementary information (incidental information, ancillary information) such as subject information, subject's eye information, date and time of acquisition (photography), and acquisition conditions (photography conditions). An image group of some examples may include an image obtained by using another modality, examination data acquired by using an examination apparatus, or the like. Some examples of the configuration and the operation of the image group assessing processor 81 are described below with reference to FIG. 5A to FIG. 5D.

A description will be given of the second example of the data processor 8. The effectiveness of the present example is particularly demonstrated in the case where two or more times of scans are applied to the subject's eye E (the three dimensional region that includes the corner angle CA). The data processor 8B shown in FIG. 4B includes the image set forming processor 82 in addition to the image group assessing processor 81 that is the same as or similar to that of FIG.

4A. The data processor 8B is provided with two or more image groups collected by two or more times of scans applied to the subject's eye E (the three dimensional region that includes the corner angle CA). The image group assessing processor 81 of the present example may execute a quality assessment of each of these image groups, or alternatively may execute a quality assessment of only an image group acquired by the first scan out of the two or more times of scans. The image set forming processor 82 is configured to execute a formation of an image set by selecting a series of images corresponding to a scan area from the two or more image groups input into the data processor 8B.

The area represented by the series of images composing the image set may correspond to, for example, a three dimensional region to which any one of the two or more scans has been applied, or a three dimensional region determined based on scan areas of at least two of the two or more scans. As an example of the former, the maximum (largest) scan area or the minimum (smallest) scan area among the two or more scan areas to which the two or more scans have been respectively applied may be employed. As an example of the latter, the union set or the intersection set of the at least two scan areas may be employed.

The formed image set may include only the above-mentioned series of images corresponding to the scan area, or may include other information in addition to the series of images. Examples of information that may be included in the image set together with the series of images include various kinds of supplementary information (incidental information, ancillary information) such as subject information, subject's eye information, date and time of acquisition (photography), and acquisition conditions (photography conditions). The image set may also include an image obtained by using another modality, examination data acquired by using an examination apparatus, or the like.

A description will be given of the third example of the data processor 8. As in the second example, the effectiveness of the present example is particularly demonstrated when two or more times of scans are applied to the subject's eye E (the three dimensional region that includes the corner angle CA). The data processor 8C shown in FIG. 4C includes both the image group assessing processor 81 configured in the same or similar manner as or to that of FIG. 4A and the image set forming processor 82 configured in the same or similar manner as or to that of FIG. 4B. However, the image set forming processor 82 of the present example includes the selecting processor 821.

The data processor 8C is provided with two or more image groups collected by two or more times of scans applied to the subject's eye E (the three dimensional region that includes the corner angle CA). The image group assessing processor 81 of the present example may execute a quality assessment of each of these image groups, or may execute a quality assessment of only the image groups acquired by the first scan. The image set forming processor 82 is configured to execute a formation of an image set by selecting a series of images corresponding to a scan area from the two or more image groups input into the data processor 8C. In this process of image set formation, the selecting processor 821 executes selection of images each of which satisfies a predetermined condition from the two or more image groups.

The predetermined condition (image selection condition) may be the same as or different from the image group assessment condition described above. In some examples in which the data processor 8C is configured in such a manner that the selecting processor 821 is provided with two or more image groups after the image group assessing processor 81 executes a quality assessment of each of the images, the selecting processor 821 may be configured to execute image selection in consideration of a condition relating to an image arrangement (image order, image sequence, etc.). Here, examples of such a condition include the blinking condition and the eye movement condition described above. Note that the image selection condition is not limited to these examples, and the relationship between the image group assessment condition and the image selection condition is also not limited to these examples.

Below, descriptions will be given of a case in which the selecting processor 821 takes the blinking condition into consideration and a case in which the selecting processor 821 takes the eye movement condition into consideration. In addition, for cases in which the selecting processor 821 takes into consideration a condition other than these two conditions, the selecting processor 821 may be configured to be capable of executing the same or similar processing as or to some specific examples regarding the image group assessing processor 81. These specific examples will be described later with reference to FIG. 5A to FIG. 5D.

A description will be given of image selection with the blinking condition taken into account. Note that the blinking condition is a condition for checking whether or not an image to be assessed has been affected by blinking. For an image included in the two or more image groups, the selecting processor 821 performs determination whether or not a reflected image of the slit light projected onto the anterior segment of the subject's eye E is included in this image, for example. This determination is data processing carried out on the basis of a fact that a reflected image of the slit light is not depicted in an image taken during blinking and a fact that a reflected image of the slit light is represented significantly brighter than other areas. The determination is carried out, for example, based on the brightness distribution in an image being processed.

In some aspect examples, the selecting processor 821 generates a brightness histogram based on an image and then determines whether or not there is a pixel having brightness equal to or greater than a predetermined threshold value. If the selecting processor 821 determines that there is a pixel having brightness equal to or greater than the predetermined threshold value, it is determined that a reflected image of the slit light is included in this image. The present example has an advantage of being extremely simple to process, but it may falsely detect a high-brightness noise or a reflection of environment light (ambient light).

In some other aspect examples, the selecting processor 821 generates a brightness histogram based on an image and then determines whether or not there are a predetermined number or more of pixels having brightness equal to or greater than a predetermined threshold value. If the selecting processor 821 determines that the number of pixels having brightness equal to or greater than the predetermined threshold value is equal to or greater than the predetermined number, it is determined that a reflected image of the slit light is included in this image. The present example has an advantage that the above false detection can be prevented by simple processes as described above.

A description will be given of image selection with the eye movement condition taken into account. Note that the eye movement condition is a condition for checking whether or not an image to be assessed has been affected by eye movement. For an image included in the two or more image groups, the selecting processor 821 performs determination whether or not eye movement has affected this image by comparing this image with an image adjacent thereto, for example. This determination is data processing carried out on the basis of a fact that eye movement during moving image photography causes "skipping (lack, omission) of an image".

In some aspect examples, the selecting processor 821 detects a landmark from each of this image and the adjacent image, calculates the amounts of displacements (position shifts, positional differences, positional deviations) of the detected landmarks, and determines whether or not each of the displacement amounts calculated is equal to or greater than a predetermined threshold value. If the selecting processor 821 determines that the displacement amount(s) is equal to or greater than the predetermined threshold value, it is determined that eye movement has occurred. Here, the landmark may be, for example, a cornea, an iris, a pupil, a corner angle, or the like. The threshold value may be calculated based on a predetermined scanning condition such as the photographing rate of the photography system 3, the movement speed of the photography system 3 carried out by the movement mechanism 6, or the like.

In some other aspect examples, the selecting processor 821 may be configured to determine the presence or absence of eye movement from a single image. For example, when the photographing rate of the photography system 3 is low and high-speed eye movement occurs, "blurring" may occur in an image obtained. The selecting processor 821 may be configured to determine the presence or absence of eye movement by using a blur detection technique. The blur detection of some typical examples is performed by using any known techniques such as edge detection.

As in the case of the image group assessing processor 81, the selecting processor 821 may include an artificial intelligence engine configured to determine whether or not an input image satisfies the image selection condition described above.

The series of images included in the image set formed by the image set forming processor 82 may be associated with a plurality of positions (a plurality of locations) in the scan area. For example, the selecting processor 821 may be configured to perform selection of images in such a manner as to assign one or more images to each of the plurality of positions in the scan area.

A specific example will be explained. As mentioned above, the scan area along the X direction is divided into N-1 number of sections (intervals), the scan start position is determined at the first position, and the scan end position is determined at the N-th position. Here, N is an integer equal to or greater than 2. As a result, N number of positions are determined in the scan area. The N number of positions are represented by B1, B2, B3, . . . , BN.

It is now considered a case in which a result of application of two or more times of scans to the anterior segment of the subject's eye E has generated the image groups F1, F2, F3, . . . , FN shown in FIG. 3. Note that in the description given above, the N number of images F1 to FN shown in FIG. 3 forms an image group obtained by a single scan. However, in the present document for the sake of simplicity of description, the N number of images F1 to FN shown in FIG. 3 may sometimes be treated as (used as) any image group (any plurality of images) to be considered. The same applies hereinafter. For example, in the description of the present example, the N number of images F1 to FN are treated as a series of images included in an image set.

For the N number of positions B1 to BN and the N number of images F1 to FN, the selecting processor 821 may assign the image Fn to the position Bn. As a result of this, the N number of images Fn (n=1, 2, . . . , N) respectively corresponding to the N number of positions Bn (n=1, 2, . . . , N) can be obtained, and then an image set can be formed with the image group Fn as "a series of images", for example.

In some aspect examples, if the image group assessing processor 81 has determined that the quality of an image group obtained by the first scan is not satisfactory, the second scan is then performed automatically or upon an instruction given by the user. If the number of scans applied to the anterior segment is two or more, the slit lamp microscope 1 performs an operation of applying the two or more times of scans to the anterior segment and an operation of selecting a series of images from two or more image groups collected by the two or more times of scans. Here, a way how to perform these operations (execution modes of these operations) may be freely selected or determined. In the first example thereof, the slit lamp microscope 1 may be configured to alternately execute (to execute by turns) application of a scan to the anterior eye segment and selection of an image from an image group acquired by this scan, in response to acquisition of an assessment result showing the quality of an image group obtained by the first scan is not satisfactory. In the second example, the slit lamp microscope 1 may be configured to perform two or more times of scans in a row and then select a series of images from two or more image groups collected by the two or more times of scans, in response to acquisition of an assessment result showing the quality of an image group obtained by the first scan is not satisfactory. These two examples will be described below. It should be noted that in place of or in addition to selection of an image from an image group(s), the image group assessing processor 81 may execute an assessment of an image group. As mentioned above, an image group assessment and image selection may be the same, similar, or interchangeable processes. In some aspect examples, any matters and items in a description of an image group assessment may be applied to image selection, and conversely, any matters and items in a description of image selection may be applied to an image group assessment.

The first example of the aspect (mode) of the scan application and the image selection performed after the image group assessing processor 81 has assessed that the quality of an image group obtained by the first scan is not satisfactory, is the alternate execution of the scan application and the image selection. More specifically, the first example is operated to repeat, a predetermined number of times, the pair of the application of a scan to the anterior eye segment and the selection of an image from an image group acquired by this scan, for example. In other words, the first example is operated to execute the U number of pairs of operations (here, U is an integer equal to or greater than 1) in the order of the first pair of operations (the scan application and the image selection), the second pair of operations (the scan application and the image selection), . . . , and the U-th pair of operations (the scan application and the image selection). Further, the pair of the first scan performed before this alternate execution and the quality assessment of the image group obtained by the first scan (by the image group assessing processor 81) will be referred to as the 0-th pair of operation.

Here, the number of scans in the u-th pair may be any number of times equal to or greater than 1 (u=0, 1, . . . , U). Further, the number of scans in the $u_1$-th pair and the number of scans in the $u_2$-th pair may be equal to or different from each other (here, $u_1$=0, 1, . . . , U; $u_2$=0, 1, . . . , U; $u_1 \neq u_2$).

In the first example, the selecting processor 821 may be configured to form a tentative image set (provisional image set, temporary image set, interim image set) by selecting two or more images from two or more image groups collected by two or more times of scans already performed. In other words, the slit lamp microscope 1 may be configured to form, at any point of time during the alternate execution of the scan application and the image selection, a tentative image set from two or more image groups obtained by two or more times of scans that have been performed up to this point of time. For example, the selecting processor 821 may be configured to form a tentative image set from all images obtained by the 0-th to the u-th pairs after the scan in the u-th pair has been performed. With such a configuration, the slit lamp microscope 1 is capable of forming a tentative image set from two or more image groups obtained up to the present point of time for the purpose of constructing a final image set.

In the case where the configuration described above is employed for forming a tentative image set, the following configuration may be combined with the configuration described above. Immediately after another scan is applied to the anterior segment of the subject's eye E, the selecting processor 821 first selects one or more images from another image group collected by this another scan. Subsequently, the selecting processor 821 forms another tentative image set (new tentative image set) by adding the one or more images selected from this another image group to a tentative image set that has been formed based on one or more scans performed prior to this another scan. For example, after the scan in the (u+1)-th pair have been performed, the selecting processor 821 may first select one or more images from an image group obtained by the (u+1)-th pair. Further, the selecting processor 821 may form another tentative image set by adding the one or more image selected from the image group obtained in the (u+1)-th pair to a tentative image set formed based on the image group(s) obtained by the 0-th to the u-th pairs. With such a configuration, each time a scan is applied to the anterior segment, the selecting processor 821 can sequentially update a tentative image set based on an image group obtained by this scan. This makes it possible to construct a final image set reliably and efficiently.

In the case where the configuration described above is employed for forming (and updating) a tentative image set, the following configuration may be combined with the configuration described above. The controller 7 (or the image set forming processor 82 (the selecting processor 821)) includes an image number counter configured to count the number of images included in a tentative image set. The controller 7 controls the scanner (the illumination system 2, the photography system 3, the movement mechanism 6) and the selecting processor 821 to terminate the alternate execution of the scan application and the image selection when the number of images included in the tentative image set reaches a predetermined number. Here, the predetermined number is the number of a series of images included in a final image set, and may be determined in advance or from a status of processing. Further, the controller 7 makes determination as to whether or not the number of images included in the tentative image set has reached the predetermined number. This determination may include only a process of comparing the number of images. Alternatively, in the case where a plurality of positions in the scan area and a series of images are associated with each other (described above), the controller 7 may determine whether or not a corresponding image has been assigned to every one of the plurality of positions. With such a configuration, the alternate execution of the scan application and the image selection can be automatically terminated upon obtaining the required number of images for a final image set.

In the case where the configuration described above is employed for forming (and updating) a tentative image set, the following configuration can be further combined with the configuration described above. The controller 7 includes a repetition counter configured to count the number of (times of) repetitions of the alternate execution of the scan application and the image selection. The repetition counter may be configured to count the number of the repetitions of the alternate execution by counting the number of repetition of the pair of the scan application and the image selection (the first pair to the U-th pair), or by counting the number of repetition of the scan application. The controller 7 controls the scanner (the illumination system 2, the photography system 3, the movement mechanism 6) and the selecting processor 821 to terminate the alternate execution of the scan application and the image selection when the number of the repetitions in the alternate execution reaches a predetermined number. In the case where the number of the repetitions is defined in units of the pair of the scan application and the image selection, the predetermined number is equal to the total number (U+1) of the pairs determined in advance. In the case where the number of the repetitions is defined in units of the number of the scan application, the predetermined number is equal to the total number of the scan application determined in advance. Further, the controller 7 makes determination as to whether or not the number of the repetitions has reached the predetermined number. With such a configuration, the scan application and the image selection can be automatically terminated at the stage where the scan application and the image selection have been repeated the number of times determined in advance. In the case where such a configuration is not employed, the scan application and the image selection are repeated until the number of images required to construct a final image set are selected, which causes fatigue to the subject and reduces photographing efficiency. In particular, when photographing a plurality of subjects in sequence, the throughput of the photographing is greatly impaired.

As described above, the present aspect example may be configured to automatically terminate the alternate execution of the scan application and the image selection. Possible conditions for such automatic termination are not limited to the two examples described above. For example, a condition for automatic termination may be an instruction input from a user. An alternative example may be configured to measure the elapsed time from the start of the alternate execution of the scan application and the image selection and terminate the alternate execution when the measured elapsed time reaches a predetermined time. Note that in the case where the repetition rate of the scan application and the image selection is constant, the automatic termination control based on the elapsed time is equivalent to the automatic termination control based on the number of the repetitions described above. The image set forming processor 82 may form an image set based on a tentative image set that has been saved at the point of time of termination of the alternate execution of the scan application and the image selection. The tentative image set is included in the image set, for example, as a series of images corresponding to the scan area. Predetermined subject information such as subject ID, official ID, name, age, gender, etc. is separately input into the slit lamp microscope 1. The image set forming processor 82 may be configured to form an image set by generating a supplementary information of a series of images including such subject information, subject's eye information (e.g., information indicating left eye/right eye), date and time of acquisition, acquisition conditions, etc. Further, the image set may also include other images obtained with the slit lamp microscope 1, images obtained with other modalities, examination data acquired with examination apparatuses, or the like. This concludes the description of the first example of the execution mode of the scan application and the image selection. A specific example of processing according to the present example will be described later.

Next, the second example of the aspect (mode) of the scan application and the image selection performed after the image group assessing processor 81 has assessed that the quality of an image group obtained by the first scan is not satisfactory will be described. In the present example, the slit lamp microscope 1 is configured to perform two or more times of scans in a row and then select a series of images from two or more image groups collected by the two or more times of scans. Then, an image is selected from the two or more image groups collected by the two or more times of scans and the image group obtained by the first scan performed prior to the two or more times of scans, and an image set that includes a series of images selected in this way is formed.

A specific example of such an operation will be described. To begin with, the selecting processor 821 generates an association (correspondence, relationship) between an image group corresponding to each scan and a plurality of positions in the scan area (described above). With this association, two or more images corresponding to different scans are assigned to each of the plurality of positions in the scan area.

Subsequently, for each position of the plurality of positions in the scan area, the selecting processor 821 selects one image from the two or more images that have been assigned to this position. The image selection condition employed in the present example may be, for example, the blinking condition and the eye movement condition described above. With this, one image is assigned to each of the plurality of positions in the scan area. A plurality of images respectively associated with the plurality of positions in this way is used as a series of images included in an image set. This concludes the description of the second example of the execution mode of the scan application and the image selection.

The fourth example of the data processor 8 will be described. As in the second and third examples, the effectiveness of the present example is particularly demonstrated in the case where two or more times of scans are applied to the subject's eye E (the three dimensional region that includes the corner angle CA). The data processor 8D shown in FIG. 4D includes the image set assessing processor 83 in addition to the image group assessing processor 81, which is the same as or similar to that of FIG. 4A, and the image set forming processor 82, which is the same as or similar to that of FIG. 4B or FIG. 4C.

The image set assessing processor 83 is configured to execute an assessment of a quality of an image set formed by the image set forming processor 82. This quality assessment is a process of determining whether or not an image set has sufficient quality to effectively conduct diagnosis (image interpretation), and an assessment item and an assessment criterion are determined from this viewpoint. The assessment item and the assessment criterion may be common to one or more of the above-described image group assessment conditions and/or one or more of the above-described image selection conditions; however, the assessment item and the assessment criterion are not limited thereto.

The image set assessing processor 83 may be configured to execute different assessment processes depending on the types (aspects, modes) of image sets. For example, an assessment process applied to an image set formed in the case where the number of images included in a tentative image set has reached a predetermined number and an assessment process applied to an image set formed in the case where the number of the repetitions in the alternate execution of the scan application and the image selection has reached a predetermined number, may be different from each other. Note that the same assessment process may be applied regardless of the types of image sets.

Examples of an image set quality assessment include, in addition to an assessment of the quality of each image (which may be the same as or similar to an assessment of an image group), an assessment of an "arrangement order" of a series of images, an assessment of "skipping (lack, omission) of an image", and an assessment of "misalignment". Defects in an image set, such as disorder in the arrangement order, skipping (lack, omission) of an image, misalignment, etc., are caused by eye movement, fixation shift (fixation deviation), or the like.

The assessment of the arrangement order of a series of images will be described. In some aspect examples, the above-mentioned correspondence (one-to-one correspondence) between a series of images and a plurality of positions in a scan area is determined and prepared in advance. The image set assessing processor 83 may execute an arrangement order assessment using this correspondence.

Here, the plurality of positions in the scan area is ordered in accordance with their positional relationships in the real space. An example will be described now. As described above, the scan area along the X direction is divided into the N-1 number of sections, and the N number of positions B1, B2, B3, . . . , BN are set in order from the scan start position to the scan end position. In other words, the N number of positions B1 to BN are ordered in accordance with their positional relationships in the real space. In addition, a one-to-one correspondence is given between the N number of images F1 to FN (a series of images) and the N number of positions B1 to BN.

Under such conditions, the image set assessing processor 83 arranges the N number of images F1 to FN in accordance with the arrangement order (relative positional relationships) of the N number of positions B1 to BN, for example. This arrangement processing may be implemented by, for example, determining the coordinates of the N number of positions B1 to BN in a given three dimensional coordinate system, and arranging (embedding) the N number of images F1 to FN in the three dimensional coordinate system in accordance with the N number of coordinates determined. More specifically, the image set assessing processor 83 of some aspect examples may be configured to extract the slit light projected regions A1 to AN from the N number of images F1 to FN, respectively. Here, the slit light projected regions A1 to AN are two dimensional cross sectional images. The image set assessing processor 83 of the aspect examples further determines the coordinates of the N number of positions B1 to BN in the three dimensional coordinate system, and then executes a process of embedding the N number of two dimensional cross sectional images A1 to AN into the three dimensional coordinate system in accordance with the N number of coordinates determined.

The image set assessing processor 83 may be configured to analyze the images F1 to FN (the two dimensional cross sectional images A1 to AN) embedded in the three dimensional coordinate system to execute an assessment of whether or not their arrangement order is appropriate. In some aspect examples, the image set assessing processor 83 may be configured to detect a region of interest from the images F1 to FN (the two dimensional cross sectional images A1 to AN) and execute an assessment based on the morphology (e.g., connectivity (connectedness), continuity, etc.) of the region of interest in the arrangement direction of the images F1 to FN (the two dimensional cross sectional images A1 to AN). Here, the arrangement direction of the images F1 to FN is the X direction in the present example, and the region of interest is an image region corresponding to a site of interest such as the anterior surface of the cornea, the posterior surface of the cornea, the iris, the pupil, the anterior surface of the crystalline lens, the posterior surface of the crystalline lens, the corner angle, or the like. For example, if there exists a gap of the size equal to or larger than a predetermined size in the region of interest, the arrangement order is determined to be inappropriate, or it is determined that there is a change (replacement, swapping) in the arrangement order.

In some other aspect examples, the image set assessing processor 83 may be configured to construct a cross sectional image along the X direction, from the images F1 to FN (the two dimensional cross sectional images A1 to AN) embedded in the three dimensional coordinate system. In addition, the image set assessing processor 83 may be configured to execute an assessment based on the morphology (e.g., connectivity, continuity, etc.) of this cross sectional image constructed.

The assessment of skipping (lack, omission) of an image and the assessment of misalignment may be executed in the same manner as the arrangement order assessment described above.

As with the image group assessing processor 81 and the selecting processor 821, the image set assessing processor 83 may include an artificial intelligence engine configured to execute an assessment whether or not an input image set has sufficient quality for effective diagnosis.

The controller 7 may be configured to execute a control of the communication device 9 to transmit an image set when the image set assessing processor 83 assesses that the quality of this image set is satisfactory. For example, the controller 7 prepares transmission information including such an image set, and then controls the communication device 9 to transmit this transmission information to a predesignated external device.

Possible modes or aspects of outputting an image set (and other information) from the slit lamp microscope 1 are not limited to transmission. Examples of output modes other than transmitting include storing in a storage (e.g., database), recording on a recording medium, printing on a printing medium, and so forth.

The controller 7 may be configured to execute a control for applying another scan to the subject's eye E (the three dimensional region that includes the corner angle CA) when the image set assessing processor 83 assesses that the quality of the image set is not satisfactory. In other words, the controller 7 may be configured to execute a control to acquire another image group (another image set) when the image set assessing processor 83 assesses that the quality of the image set is not satisfactory. For example, the controller 7 may be configured to display predetermined output information and/or perform audio (voice) output of predetermined output information. The predetermined output information may include contents for prompting or suggesting the user to conduct re-photographing (another photographing), for example, contents indicating that the performed photography (acquisition, image acquisition) was unsuccessful, or that re-photographing is necessary.

In some other aspect examples, the controller 7 may be configured to send a command to at least the scanner (the illumination system 2, the photography system 3, the movement mechanism 6) and the image set forming processor 82 in order to automatically start re-photographing (re-execution of scan application and image set formation).

<Communication device 9>

The communication device 9 performs data communication between the slit lamp microscope 1 and another apparatus (external device). In other words, the communication device 9 performs transmission of data to another apparatus and reception of data transmitted from another apparatus.

For example, the communication device 9 is configured to be capable of performing transmission of at least one or more images of an image group collected by scanning, with slit light, a three dimensional region that includes the corner angle CA to another device (first external device). Further, the communication device 9 is configured to be capable of performing transmission of data generated from such an image group by the data processor 8 to another device (second external device). The first external device and the second external device may be the same device or may be different devices. In the case where the first external device and the second external device are the same, this external device may be any of the following devices, for example: an image interpretation computer terminal, an image interpretation apparatus, and a computer configured to execute processing different from the processing executed by the data processor 8. On the other hand, in the case where the first external device and the second external device are different, the first external device may be any of an image interpretation computer terminal, an image interpretation apparatus, a computer configured to execute processing same as or similar to the processing executed by the data processor 8, and a computer configured to execute processing different from the processing executed by the data processor 8, and the second external device may be any of an image interpretation computer terminal, an image interpretation apparatus, and a computer configured to execute processing different from the processing executed by the data processor 8. In the case where the first external device and the second external device are different, the controller 7 may be configured to execute selection of a destination external device according to the type of data to be transmitted.

The system or method of the data communication executed by the communication device 9 may be selected accordingly. For example, the communication device 9 may include any one or more of various kinds of communication interfaces such as a communication interface conforming to the Internet, a communication interface conforming to a dedicated line, a communication interface conforming to a local area network (LAN), and a communication interface conforming to near field communication. The data communication may include any one of or both wireless communication and wired communication.

Data sent and received by the communication device 9 may be encrypted. If this is the case, for example, any one of or both the controller 7 and the data processor 8 include(s) at least one of an encryptor and a decryptor. The encryptor is configured to encrypt data to be sent by the communication device 9. The decryptor is configured to decrypt data having been received by the communication device 9.

\<Memory 10\>

The memory 10 is configured to retain various kinds of data. For example, the memory 10 retains an image group collected by scanning the subject's eye E (e.g., a three dimensional region including the corner angle CA) with slit light, an image set formed from two or more image groups, analysis data generated by image analysis, and so forth. The controller 7 is configured to execute processing for storing data in the memory 10 and processing for reading out data from the memory 10. The storing process and reading-out process are executed at the appropriate times in various kinds of operations of the slit lamp microscope 1.

The memory 10 includes a freely selected types of storage, and includes at least one of a non-volatile storage and a volatile storage. The memory 10 includes, for example, any one or both of a hard disk drive and a semiconductor memory.

\<Image group assessing processor 81\>

Several examples of the image group assessing processor 81 are described with reference to FIG. 5A to FIG. 5D. Note that the image group assessing processor 81 is not limited to these examples, and any modifications, such as additions, replacements, and/or omissions, are possible. In addition, any two or more of these examples and modifications may be combined at least in part.

Figure 5A:
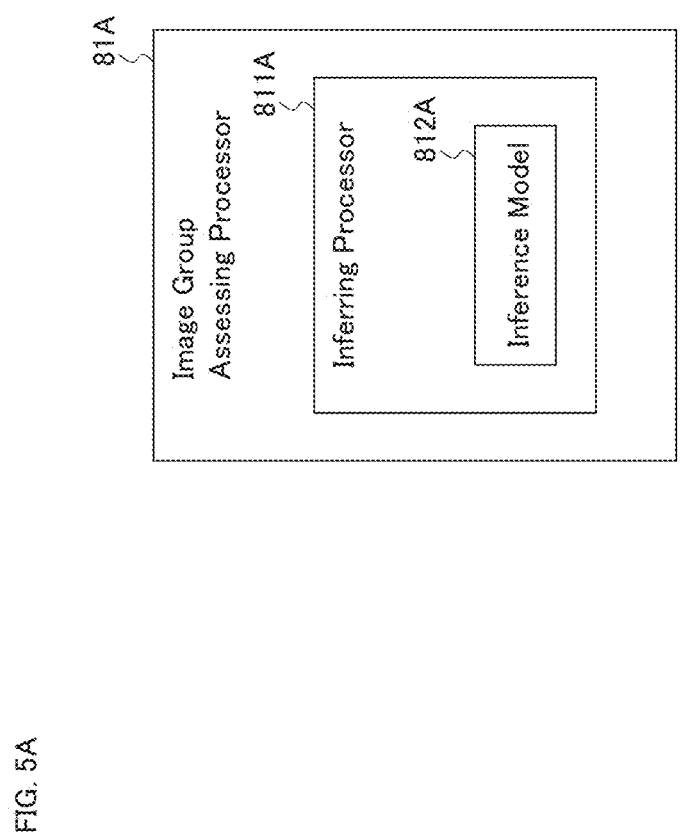
FIG. 5A is a schematic diagram illustrating a configuration of a slit lamp microscope according to an aspect example.

The first example of the image group assessing processor 81 will be described with reference to FIG. 5A and FIG. 5B. The present example utilizes artificial intelligence technology to execute a quality assessment of an image group. The image group assessing processor 81A shown in FIG. 5A includes the inferring processor 811A configured to execute a quality assessment of an image group using the inference model 812A.

The inference model 812A is constructed in advance by using machine learning with training data including a plurality of anterior segment images. The device for constructing the inference model 812A (inference model construction device) may be disposed in the slit lamp microscope 1 (the data processor 8, etc.), or in a peripheral device (a peripheral computer or the like) of the slit lamp microscope 1. Alternatively, the inference model construction device may be a computer other than the peripheral computer.

Figure 5B:
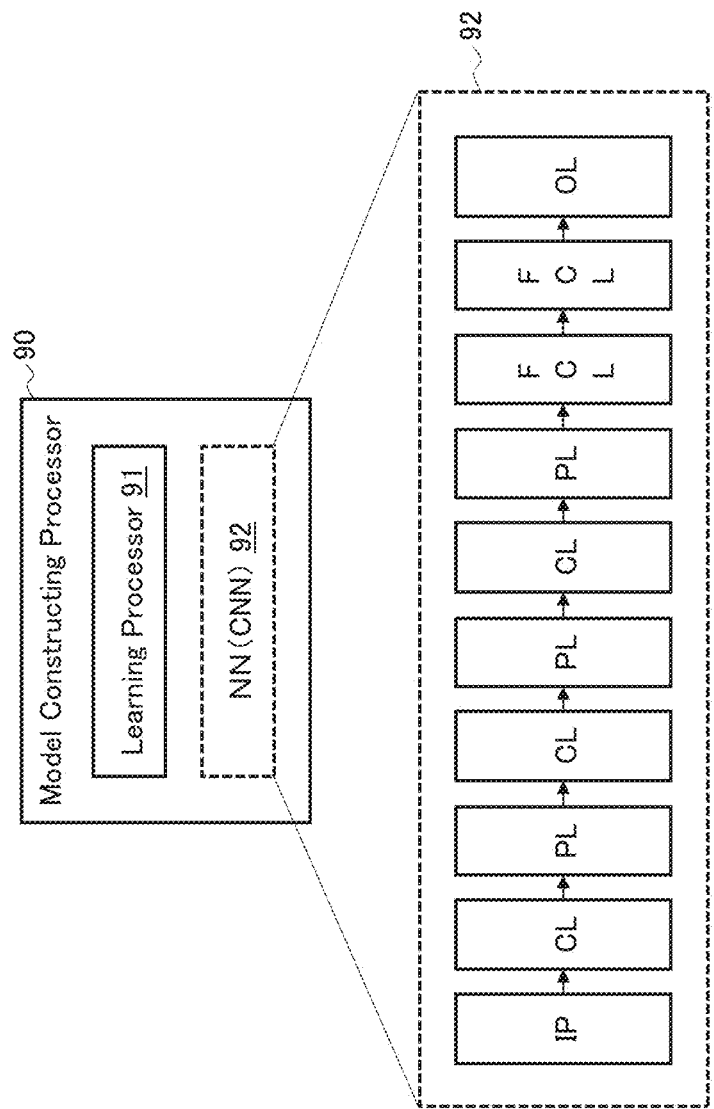
FIG. 5B is a schematic diagram for describing construction of an inference model for a slit lamp microscope according to an aspect example.

The model constructing processor 90 shown in FIG. 5B is an example of the inference model construction device, and is provided in the slit lamp microscope 1 or in its peripheral device. The model constructing processor 90 includes the learning processor 91 and the neural network 92.

In some typical examples, the neural network 92 includes a convolutional neural network (CNN). FIG. 5B shows an example of the structure of this convolutional neural network.

An image is input into the input layer of the neural network 92. Behind the input layer, a plurality of pairs of a convolutional layer and a pooling layer is disposed. While three pieces of pairs of a convolution layer and a pooling layer are provided in the neural network 92 shown in FIG. 5B, the number of the pairs may be freely selected or determined.

In the convolutional layer, a convolution operation is performed to detect or extract a feature (e.g., contour) from the input image. This convolution operation is a multiply-accumulate operation (a multiply-add operation, a product-sum operation) on the input image. This multiply-accumulate operation is performed with a filter function (a weight coefficient, a filter kernel) having the same dimension as the input image. In the convolutional layer, the convolution operation is applied to individual parts (individual sections, individual portions) of the input image. More specifically, the convolutional layer is configured to calculate a product by multiplying the value of each pixel in a partial image, to which the filter function has been applied, by the value (weight) of the filter function corresponding to this pixel, and then calculate the sum of the products over a plurality of pixels in this partial image. The sum of products obtained in this way is substituted for the corresponding pixel in an image to be output from the convolutional layer. By repetitively performing such multiply-accumulate operation in parallel with moving sites (parts) to which the filter function is applied (that is, in parallel with changing or switching partial images of the input image), a result of the convolution operation for the entire input image is obtained. The convolution operation performed in this way gives a large number of images in which various features have been extracted using a large number of weight coefficients. This means that a large number of filtered images, such as smoothed images and edge images, are obtained. The large number of images generated by the convolutional layer are referred to as feature maps (or activation maps).

The pooling layer executes data compression (e.g., data thinning) of the feature maps generated by the convolutional layer disposed at the immediately preceding position. More specifically, the pooling layer calculates statistical values in predetermined neighboring pixels of a predetermined pixel of interest in an input feature map at each predetermined pixel intervals, and outputs an image having a size smaller than the input feature map. The statistical values applied to the pooling operation may be maximum values (max pooling) or average values (average pooling), for example. The value of the pixel intervals applied to the pooling operation is referred to as a stride.

In general, a convolutional neural network extracts many features from an input image by executing processing using a plurality of pairs of a convolutional layer and a pooling layer.

A fully connected layer is disposed behind the most downstream pair of a convolutional layer and a pooling layer. While two pieces of fully connected layers are provided in the example shown in FIG. 5B, the number of fully connected layers may be freely selected or determined. The fully connected layer executes processing such as image classification, image segmentation, or regression using the features compressed by the combination of convolution and pooling. An output layer is disposed behind the most downstream fully connected layer. The output layer gives an output result.

Some aspect examples may employ a convolutional neural network including no fully connected layer. For example, some aspect examples may employ a fully convolutional network (FCN). Some aspect examples may include a support vector machine, a recurrent neural network (RNN), or any other models. Further, machine learning applied to the neural network 92 may be transfer learning. In other words, the neural network 92 may include a neural network that has already been trained using other training data (training images) and whose parameters have been adjusted (tuned). Further, the model constructing processor 90 (the learning processor 91) may be configured in such a manner that fine tuning can be applied to a trained neural network (at least part of the neural network 92). The neural network 92 may be constructed, for example, using a known open source neural network architecture.

The learning processor 91 applies machine learning with training data to the neural network 92. In the case in which the neural network 92 includes a convolutional neural network, parameters tuned by the learning processor 91 include, for example, filter coefficients of one or more convolutional layers therein and connection weights and offsets of one or more fully connected layers therein.

The training data of the present example at least includes a plurality of anterior segment images, as described above. The plurality of anterior segment images in some typical examples is images acquired by a slit lamp microscope but is not limited thereto. In some examples, the plurality of anterior segment images may include any of the following images: an image acquired using other kinds of ophthalmic modalities (e.g., fundus camera, OCT apparatus, SLO, surgical microscope); an image acquired using any kinds of diagnostic imaging modalities of any clinical departments other than ophthalmology (e.g., ultrasonic diagnostic apparatus, X-ray diagnostic apparatus, X-ray computed tomography (CT) apparatus, magnetic resonance imaging (MRI) apparatus); an image generated by processing an actual image (image acquired from a living body); and a pseudo image. Further, the number of pieces of training data may be increased by using any technique such as data augmentation.

The method and technique of training employed for constructing the inference model may be freely selected from among any known method and technique, or may be freely designed based on any known method and technique. In some examples, the method and technique of the training may be any of supervised learning, unsupervised learning, and reinforcement learning. In some alternative examples, the method and technique of the training may be any combination of any two or more of supervised learning, unsupervised learning, and reinforcement learning.

In some aspect examples, supervised learning is conducted on the basis of training data in which a label as a final output is assigned to each input image. For example, to each of a plurality of anterior segment images included in the training data, a label is attached in advance, representing whether or not image interpretation of the corresponding image is possible. Labels may be generated by, for example, a doctor or other inference models. The learning processor 91 of the present example may be configured to construct the inference model 812A by applying supervised learning using such training data to the neural network 92.

The inference model 812A of the present example constructed in this way is a trained model (learned model) configured to receive an input of an image obtained by scanning the anterior segment with slit light, and to generate an output of a possibility of image interpretation. Note that a possibility of image interpretation, which is an output of the inference model 812A, may be a freely selected or determined type of parameter that shows whether or not an image group to be assessed is suitable for image interpretation. In some examples, a possibility of image interpretation may include any of the following options: a result of a determination (judgement) of whether image interpretation is possible or impossible; a probability of image interpretation being able to be conducted; a validity (e.g., accuracy, precision) of a result obtained by conducting image interpretation, and so forth.

In order to prevent the overconcentration of processes in a specific unit of the neural network 92, the learning processor 91 may randomly select and invalidate one or more units and execute learning using the remaining units. Such a function is referred to as dropout.

The methods and techniques used for inference model creation are not limited to the examples shown above. In some examples, any methods and techniques such as the following options may be employed for creating an inference model: support vector machine, Bayes classifier, boosting, k-means clustering, kernel density estimation, principal component analysis, independent component analysis, self-organizing map (or self-organizing feature map), random forest (or randomized trees, random decision forests), and generative adversarial network (GAN).

Using the inference model 812A as described above, the inferring processor 811A shown in FIG. 5A executes an assessment of a quality of an image group collected by a single scan of the anterior segment of the subject's eye E. More specifically, first, the inferring processor 811A inputs an image group or each image included in the image group into the inference model 812A. In response to this input, the inference model 812A derives information representing image interpretation possibility from the image group or the corresponding image included in the image group.

The inferring processor 811A may use the interpretation possibility information output from the inference model 812A as it is as an inference result, or may generate an inference result on the basis of the interpretation possibility information. As an example of the latter, the inferring processor 811A may generate information for display from the interpretation possibility information, or may execute predetermined statistical processing.

Figure 5C:
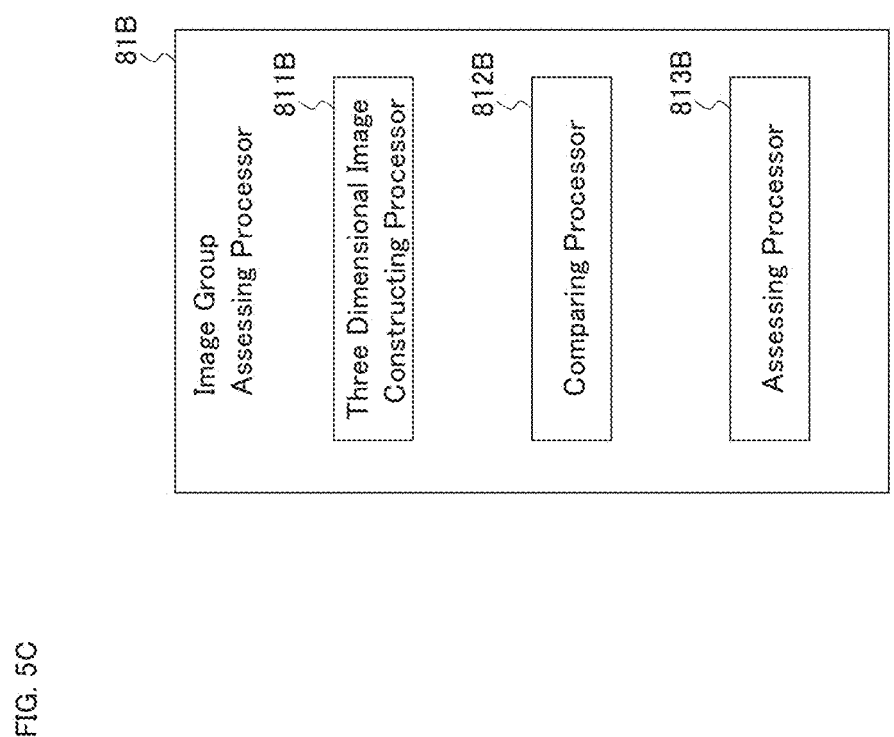
FIG. 5C is a schematic diagram illustrating a configuration of a slit lamp microscope according to an aspect example.

The second example of the image group assessing processor 81 will be described with reference to FIG. 5C. The present example transforms an image group into a three dimensional image and then executes a quality assessment. The image group assessing processor 81B shown in FIG. 5C includes the three dimensional image constructing processor 811B, the comparing processor 812B, and the assessing processor 813B.

The three dimensional image constructing processor 811B is configured to execute construction of a three dimensional image from an image group collected by a single scan of the anterior segment of the subject's eye E. For example, the three dimensional image constructing processor 811B may be configured to construct stack data by embedding an image group in a single three dimensional coordinate system. This stack data is constructed, for example, by embedding the N number of two dimensional cross sectional images A1 to AN shown in FIG. 3 into a three dimensional coordinate system in accordance with the arrangement (relative positional relationships) of the N number of positions B1 to BN mentioned above.

The three dimensional image constructing processor 811B may be configured to apply a voxelization process to stack data constructed from an image group to construct volume data. In addition, the three dimensional image constructing processor 811B may apply a predetermined rendering process to stack data or volume data. Examples of the rendering process include volume rendering and surface rendering.

The comparing processor 812B is configured to execute a comparison between the three dimensional image (stack data, volume data, rendered image, etc.) constructed by the three dimensional image constructing processor 811B and a predetermined reference three dimensional image. The number of prepared reference three dimensional images is one or more and freely selected or determined.

The reference three dimensional image may include one or more reference three dimensional images corresponding to normal eyes. A reference three dimensional image corresponding to a normal eye may be, for example, an image acquired by performing photography of the normal eye which is an eye with no disease diagnosed and is also referred to as a healthy eye. An imaging modality employed for acquiring this reference three dimensional image may be freely selected or determined. In some typical examples, the imaging modality is the slit lamp microscope 1 or a slit lamp microscope having the same or similar configuration as or to the slit lamp microscope 1. In addition, the reference three dimensional image corresponding to a normal eye may be either of the following images: an image acquired by performing photography of a model of a normal eye (such as an eye model); or an image generated by computer graphics based on a model of a normal eye or a clinical example.

The reference three dimensional image may include one or more reference three dimensional images corresponding to an eye with a disease (affected eye). A reference three dimensional image corresponding to an eye with a disease may be, for example, an image acquired by performing photography of an eye in which a definitive diagnosis of a specific disease has been made. While an imaging modality for acquiring such a reference three dimensional image may be freely selected or determined, a typical example of the imaging modality is the slit lamp microscope 1 or a slit lamp microscope having the same or similar configuration as or to the slit lamp microscope 1. In addition, a reference three dimensional image corresponding to an eye with a disease may be either of the following options: an image acquired by performing photography of a model of an eye with a disease (such as an eye model); or an image generated by computer graphics based on a model of an eye with a disease or a clinical example.

The comparing processor 812B is configured to execute image matching between the three dimensional image constructed by the three dimensional image constructing processor 811B and the reference three dimensional image, thereby calculating a value of a predetermined parameter. This image matching may use any method or technique such as an image correlation, feature-based matching, area-based matching, machine learning (learned model), and so forth. The parameter to be calculated may be any kind of parameter such as a correlation value, a matching parameter (e.g., angle, scale, similarity, degree of congruity (degree of agreement), etc.), an output parameter of a trained model, and so forth.

Such image matching is typically a process of generating a quantitative representation (i.e., representation by a numerical value) of a degree (extent) to which a feature (e.g., the shape and/or structure) of a tissue and/or site depicted in a three dimensional image is similar to a feature (e.g., the shape and/or structure) of a standard normal eye and/or to a feature (e.g., the shape and/or structure) of a standard eye with a disease. Here, the tissue or the site may be any of a cornea, an iris, a pupil, a corner angle, and other parts of an eye.

The assessing processor 813B is configured to execute the assessment of the quality of the corresponding image group based on the parameter value calculated by the comparing processor 812B. For example, the assessing processor 813B may be configured to execute the assessment of the quality of the corresponding image group by executing a comparison between the parameter value calculated by the comparing processor 812B and a predetermined threshold value. Alternatively, the assessing processor 813B may be configured to execute the assessment of the quality of the corresponding image group by determining whether or not the parameter value calculated by the comparing processor 812B falls within a predetermined range. Note that the method or technique used for processing executed by the assessing processor 813B is not limited to the above examples, and may be any method or technique that can be used to derive an assessment result from a value of a certain parameter.

The method or technique used for the quality assessment of an image group executed by using three dimensional image construction is not limited to the present example. In some examples, the image group assessing processor 81 may be configured to be capable of executing any one or more of the following assessment processing options in the same manner as the image set assessing processor 83: an assessment of the arrangement order of a series of images composing an image group; an assessment of skipping (lack, omission) of an image among a series of images composing an image group; and an assessment of misalignment between a series of images composing an image group.

Figure 5D:
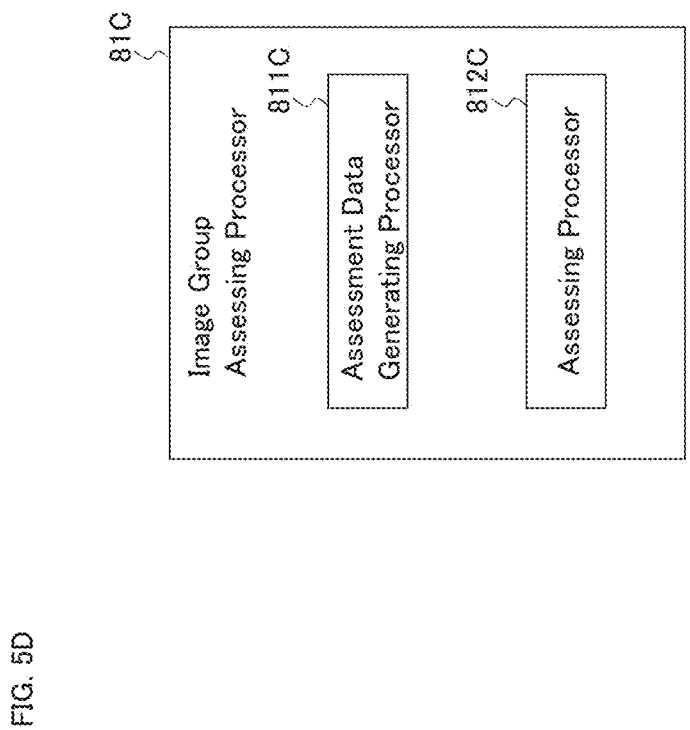
FIG. 5D is a schematic diagram illustrating a configuration of a slit lamp microscope according to an aspect example.

The third example of the image group assessing processor 81 will be described with reference to FIG. 5D. The present example executes a quality assessment by way of a quantitative assessment of an image quality of an image group. The image group assessing processor 81C shown in FIG. 5D includes the assessment data generating processor 811C and the assessing processor 812C.

The assessment data generating processor 811C is configured to execute generation of image quality assessment data from an image included in an image group collected by a single scan of the anterior segment of the subject's eye E. The image quality assessment data quantitatively represents the image quality of the image group.

Several examples of image quality assessment processing executed by the assessment data generating processor 811C will be described. In some aspect examples, the image quality assessment processing executed by the assessment data generating processor 811C may be a freely selected or determined kind of processing, and may be processing conducted by using any known technique or technology such as any of the following options: signal-to-noise ratio (SNR); contrast-to-noise ratio (CNR); root mean square (RMS) granularity; Wiener spectrum; modulation transfer function (MTF); and quality index (QI).

In some examples, the assessment data generating processor 811C calculates a value of a predetermined image quality assessment index (image quality assessment value) as image quality assessment data of an image group. An image quality assessment value may be a freely selected or determined kind of parameter that quantitatively represents a quality of an image. In some typical examples, the higher a quality of an image, the greater an image quality assessment value.

As an example of the method of calculating an image quality assessment value, a description will be given below of a method of calculating an image quality value (IQ value) used for assessing an image quality of an OCT image. To begin with, the assessment data generating processor 811C applies a predetermined analysis process (e.g., segmentation) to an assessment region determined in an image to be assessed. With this analysis process, the assessment data generating processor 811C detects an image region corresponding to a tissue (site) of the anterior segment (referred to as a tissue image region) and an image region other than the tissue image region (referred to as a background region or non-tissue image region). The assessment data generating processor 811C then generates a histogram of brightness based on the tissue image region and a histogram of brightness based on the background region. Subsequently, the assessment data generating processor 811C calculates an image quality assessment value (IQ value) based on the degree of overlap between these two histograms. For example, the range of the IQ value is defined to be [0, 100] such that the IQ value=0 when the two histograms are completely overlapping with each other and the IQ value=100 when the two histograms are completely separated from each other. This image quality assessment calculation of some examples may include normalization of two histograms, generation of a probability distribution function, calculation of an IQ value using a predetermined arithmetic expression, and so forth.

As described thus far, the assessment data generating processor 811C may be configured to execute the following processes: the process of identifying a tissue image region in an image to be assessed corresponding to a tissue of an anterior segment and identifying a background region; the process of generating the first histogram showing a frequency distribution of brightness (brightness frequency distribution) in the tissue image region; the process of generating the second histogram showing a brightness frequency distribution in the background region; and the process of calculating the image quality assessment value (IQ value), which is used as an image quality assessment data, based on the first histogram and the second histogram.

The assessment processor 812C is configured to execute an assessment of a quality of the image group based on the image quality assessment data generated by the assessment data generating processor 811C. While several methods and techniques for a quality assessment conducted based on image quality assessment data will be described below, quality assessment methods and techniques are not limited to these examples and may be freely selected from known methods and techniques.

A description is given of the first example of the quality assessment executed based on image quality assessment data. In the case where an IQ value is obtained for each image included in an image group, the assessing processor 812C executes a comparison between each of the plurality of IQ values obtained for this image group and a predetermined threshold value. If all of the plurality of IQ values are equal to or greater than the threshold value, the assessing processor 812C determines that the quality of the image group is satisfactory. On the other hand, if any one or more of the plurality of IQ values are less than the threshold value, the assessing processor 812C determines that the quality of the image group is not satisfactory.

A description is given of the second example of the quality assessment executed based on image quality assessment data. In the case where an IQ value is obtained for each image included in an image group, the assessing processor 812C executes selection of the lowest IQ value from among the plurality of IQ values obtained for this image group, and executes a comparison between this selected lowest IQ value and a predetermined threshold value. If the lowest IQ value is equal to or greater than the threshold value, the assessing processor 812C determines that the quality of the image group is satisfactory. On the other hand, if the lowest IQ value is less than the threshold value, the assessing processor 812C determines that the quality of the image group is not satisfactory.

A description is given of the third example of the quality assessment executed based on image quality assessment data. In the case where an IQ value is obtained for each image included in an image group, the assessing processor 812C executes application of a predetermined statistical calculation to the plurality of IQ values obtained for this image group, thereby calculating a statistical value. The type of this statistical value may be freely selected or determined, and may be, for example, any of the following options: a mean value (average value), minimum value, maximum value, mode, and median value. Note that the case where a minimum value is used as the statistical value corresponds to the second example described above. The assessing processor 812C executes a comparison between the calculated statistical value and a predetermined threshold value. If the statistical value is equal to or greater than the threshold value, the assessing processor 812C determines that the quality of the image group is satisfactory. On the other hand, if the statistical value is less than the threshold value, the assessing processor 812C determines that the quality of the image group is not satisfactory.

The processing executed by the assessing processor 812C is not limited to processing on the basis of image quality assessment data generated by the assessment data generating processor 811C. In some examples, the assessing processor 812C may be configured to be capable of executing any one or more of the following options of assessment processing (all of which are described above): an assessment of the arrangement order of a series of images composing an image group; an assessment of skipping (lack, omission) of an image among a series of images composing an image group; and an assessment of misalignment between a series of images composing an image group.

<Other elements>

In addition to the elements shown in FIG. 1, the slit lamp microscope 1 may further include a display device and an operation device. In some other aspect examples, a display device and an operation device may be peripheral devices of the slit lamp microscope 1.

The display device is configured to display various kinds of information under the control of the controller 7. The display device may include a flat panel display such as a liquid crystal display (LCD).

The operation device includes a device for operating the slit lamp microscope 1 and/or a device for inputting information. The operation device includes, for example, a button, a switch, a lever, a dial, a handle, a knob, a mouse, a keyboard, a trackball, an operation panel, or the like.

A device such as a touch screen may be employed in which a display device and an operation device are integrated (combined).

The subject (patient) or an assistant may operate the slit lamp microscope 1 by using the display device and the operation device.

<Alignment>

A description will be given of the alignment of the slit lamp microscope 1 with respect to the subject's eye E. Alignment, in general, is an operation to place an optical system of an apparatus at an appropriate position for photography or measurement of the subject's eye E. The alignment of the present aspect example is an operation to place the illumination system 2 and the photography system 3 at appropriate positions for acquisition of a plurality of anterior segment images (a series of images, a moving image, an image group, or an image set) as shown in FIG. 3.

There are various kinds of methods and techniques for alignment of an ophthalmic apparatus. While some alignment methods and techniques will be described below, alignment methods and techniques applicable to the present aspect example are not limited to these examples.

One of the alignment methods and techniques applicable to the present aspect example is stereo alignment. Stereo alignment may be applicable to an ophthalmic apparatus capable of photographing an anterior segment from two or more mutually different directions (two or more mutually different viewpoints). A specific method of stereo alignment is disclosed by the present applicant in Japanese Unexamined Patent Application Publication No. 2013-248376. Stereo alignment includes, for example, the following steps: a step of photographing the anterior segment from different directions by two or more anterior segment cameras to acquire two or more photographed images; a step of analyzing the photographed images by a processor to determine a three dimensional position of the subject's eye; and a step of performing a movement control of an optical system by a processor based on the three dimensional position determined. With such an alignment operation, the optical system (the illumination system 2 and the photography system 3 in the present example) is brought to and placed at an appropriate alignment position with respect to the subject's eye. The position of the pupil (e.g., the center of the pupil or the center of gravity of the pupil) of the subject's eye is used as a reference (or an indicator) in a typical stereo alignment.

In addition to the stereo alignment described hereinbefore, any known alignment methods and techniques may be employed, such as an alignment method or technique using a Purkinje image formed by alignment light, an alignment method or technique using an optical lever, or an alignment method or technique using an alignment indicator. The alignment method or technique using a Purkinje image and the alignment method or technique using an optical lever or an alignment indicator uses the position of the corneal apex of the subject's eye as a reference.

Conventional typical alignment methods and techniques including the above examples are performed for the purpose of matching the optical axis of an optical system with the axis of a subject's eye. On the other hand, the present aspect example may perform alignment so as to place the illumination system 2 and the photography system 3 at a position corresponding to the scan start position.

The first example of the alignment of the present aspect example may be carried out in the following manner. First, alignment with reference to the pupil or corneal apex of the subject's eye E may be performed by applying any of the alignment methods and techniques described above. Then, the illumination system 2 and the photography system 3 may be moved (in the X direction) by a distance corresponding to a standard value of the corneal radius determined in advance or by a distance corresponding to a value obtained by adding a standard value of the corneal radius determined in advance and a predetermined value. Note that a measurement value of the corneal radius of the subject's eye E acquired in advance may be used in place of the standard value.

The second example of the alignment of the present aspect example may be carried out in the following manner. First, alignment with reference to the pupil or corneal apex of the subject's eye E may be performed by applying any of the alignment methods and techniques described above. Second, the corneal radius of the subject's eye E may be measured by analyzing an image of anterior segment. Third, the illumination system 2 and the photography system 3 may be moved (in the X direction) by a distance corresponding to the measurement value of the corneal radius of the subject's eye E or by a distance corresponding to a value obtained by adding the measurement value of the corneal radius of the subject's eye E and a predetermined value. The image of the anterior segment analyzed in the present example is an anterior segment image obtained by the photography system 3 or another image, for example. This another image here may be an image of any kind, such as an image obtained by an anterior segment camera, an image obtained by an anterior segment OCT, or the like.

The third example of the alignment of the present aspect example may be carried out in the following manner. First, the first edge position of the cornea may be determined by analyzing an image of the anterior segment acquired by the anterior segment camera for stereo alignment or by the photography system 3. Then, the illumination system 2 and the photography system 3 may be moved to a position corresponding to the first edge position or to a position shifted (moved, changed) outward from the first edge position by a predetermined distance by applying stereo alignment.

It should be noted that alignment may be performed with reference to the pupil or corneal apex of the subject's eye E by applying any of the alignment methods and techniques described above, and then the scan with slit light may be started from the position determined by the alignment. In such a case as well, a scan sequence may be determined to perform scanning of a three dimensional region that includes the corner angle CA such as a three dimensional region that includes the entire corner angle CA. For example, the scan sequence may be determined in such a manner that the scan is performed to the left from the position determined by the alignment conducted with reference to the pupil or the corneal apex and then to the right.

<Some Additional Matters and Items>

The slit lamp microscope 1 may be provided with a fixation system configured to output light for fixation of the subject's eye E (referred to as fixation light). The fixation system of some typical examples includes at least one visible light source (referred to as a fixation light source(s)) or a display device configured to display an image such as a landscape chart or a fixation target. The fixation system of some example aspects is arranged coaxially or non-coaxially with the illumination system 2 or the photography system 3. The fixation system may include an internal fixation system and/or an external fixation system. The internal fixation system is configured to present a fixation target to the subject through the optical path of an optical system of an apparatus. The external fixation system is configured to present a fixation target to the subject from outside the optical path of an optical system of an apparatus.

The types (kinds) of images that may be acquired by the slit lamp microscope 1 are not limited to the plurality of anterior segment images shown in FIG. 3. For example, the slit lamp microscope 1 may acquire any of the following types of images: a three dimensional image constructed based on the plurality of anterior segment images; a rendered image constructed based on the three dimensional image; a transillumination image (red reflex image); a moving image representing movement of a contact lens applied to the subject's eye; and an image representing a gap between a contact lens and the corneal surface by fluorescent agent administration. A rendered image will be described in another aspect example. A transillumination image is an image obtained by a red reflex technique (transillumination) for depicting opacity and foreign bodies in the eye by using the retinal reflection of illumination light. Note that the slit lamp microscope 1 may be capable of carrying out fundus photography, corneal endothelial cell photography, Meibomian gland photography, and any other imaging modalities.

Figure 6:
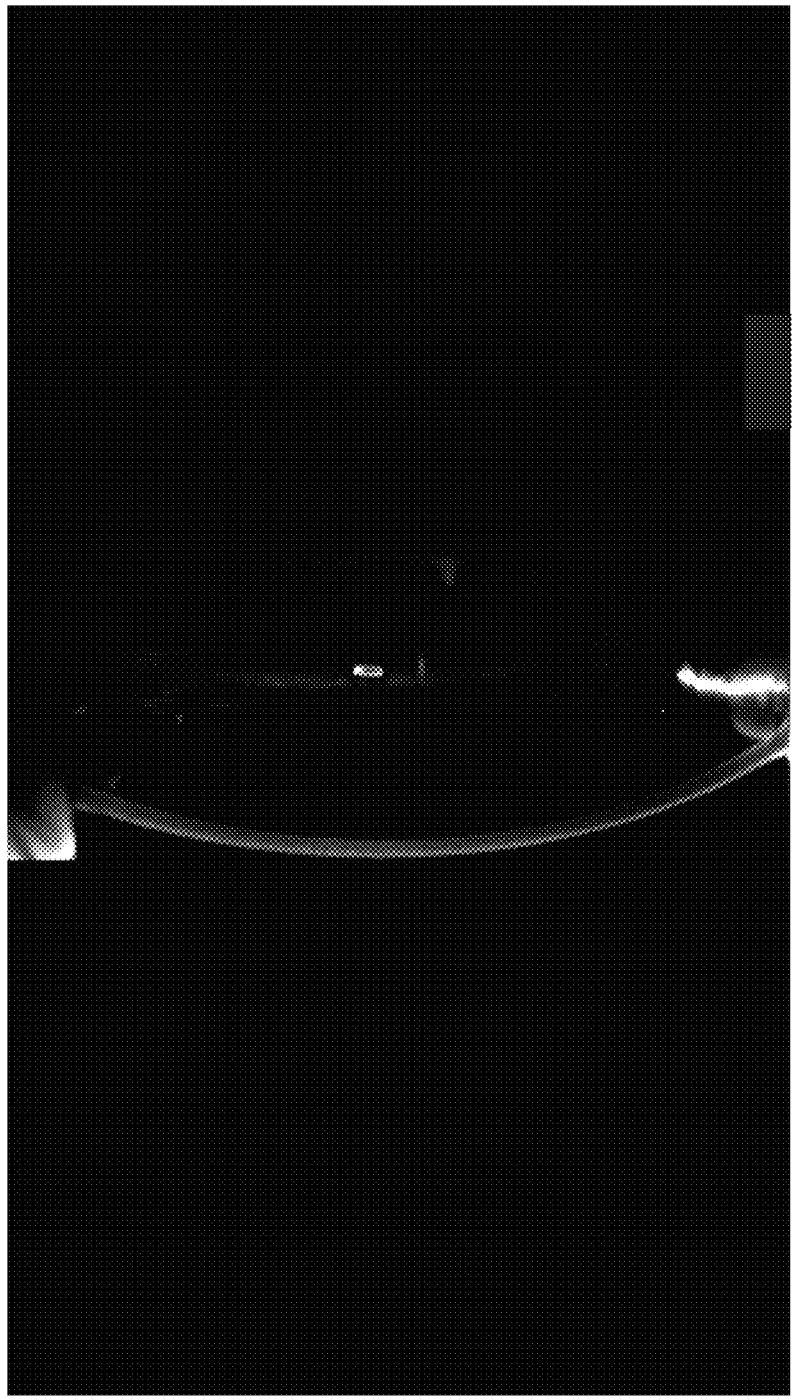
FIG. 6 is an actual image acquired by a slit lamp microscope according to an aspect example.

Further, the slit lamp microscope 1 (the data processor 8) may be configured to be capable of executing analysis processing. Corner angle analysis is an example of such analysis processing. An example of corner angle analysis performs calculation to obtain a predetermined corner angle parameter based on images (image group, image set)

acquired by the slit lamp microscope 1. Such corner angle parameter calculation requires detection of both the cornea and the iris from an image in order to determine a corner angle position. In order to achieve accurate corner angle position detection, it is desirable that both the cornea and the iris are depicted with a high image quality. FIG. 6 shows an actual image acquired by the slit lamp microscope 1. Doctors and those skilled in the art will appreciate that this image has a sufficiently high image quality.

Examples of corner angle parameters include angle opening distance (AOD), anterior chamber angle (ACA), trabecular iris space area (TISA), angle recess area (ARA), and angle-to-angle distance (AtA). The methods and techniques of corner angle parameter calculation may be freely selected or determined. In some typical examples, corner angle parameter calculation may include a process of identifying the position of a corner angle and/or a predetermined position (location) in the vicinity of the corner angle, and a measurement process of calculating a value of a corner angle parameter based on the position(s) identified. Here, the former process may be segmentation, feature point detection, or like processes, and the latter process (measurement process) may be distance measurement, ratio calculation, angle calculation, or like processes.

The parameters calculated by the slit lamp microscope 1 are not limited to corner angle parameters. In some examples, the slit lamp microscope 1 may be capable of calculating any anterior segment parameters. An anterior segment parameter is a value representing the morphology (shape, form) of an anterior segment. Examples of anterior eye parameters include radius of curvature of anterior corneal surface, radius of curvature of posterior corneal surface, radius of curvature of anterior surface of crystalline lens, radius of curvature of posterior surface of crystalline lens, corneal diameter (vertical diameter, horizontal diameter (white-to-white)), corneal thickness (central thickness, peripheral thickness), crystalline lens thickness, anterior chamber depth, anterior chamber volume, pupil diameter, and pupil center (eccentricity). The anterior segment parameter(s) may be shape distribution data, and may include, for example, corneal shape maps of various kinds such as a curvature map in the axial direction (axial curvature map), a tangential curvature map, an elevation map, a refractive power map, a thickness map (pachymetry map), a wavefront aberration map. The methods and techniques of anterior segment parameter calculation may be freely selected or determined. In some typical examples, anterior segment parameter calculation may include a process of identifying a site and/or a position to be measured (e.g., a process of segmentation, a process of feature point detection), and a measurement process of determining a value of anterior segment parameter based on the site and/or the position identified (e.g., distance measurement, ratio calculation, angle calculation).

<Operation>

Several examples of an operation of the slit lamp microscope 1 will be described.

While not shown in the drawings, the user (a subject, an examiner, or an assistant) inputs subject information into the slit lamp microscope 1 at any stage. The subject information that has been input is stored in the controller 7. The subject information of some typical examples includes identification information (identifier) of the subject (referred to as subject ID).

Furthermore, background information may also be input. The background information is any kind of information related to the subject, and examples thereof include information acquired by a medical interview of the subject, information on a sheet filled in by the subject, information recorded in the electronic medical record of the subject, and so forth. In some typical examples, the background information includes the subject's data on items such as gender, age, height, weight, disease name, possible disease name, examination result (e.g., visual acuity value, eye refractive power value, intraocular pressure value), history of a wearing device for refractive correction (e.g., history of wearing glasses, contact lenses) and the power of the device, examination history, and treatment history. These are merely examples, and possible items of the background information are not limited to these examples.

Further, in preparation for photography, the table on which the slit lamp microscope 1 is installed, the chair on which the subject sits, and the chin rest of the slit lamp microscope 1 are adjusted (all not shown in the drawings). For example, the heights of the table, chair and chin rest are adjusted. The chin rest is provided with a chin rest member and a forehead rest member for stably positioning the face of the subject.

After the completion of the preparation, the subject sits on the chair, puts his/her chin on the chin rest member, and puts his/her forehead on the forehead rest member. Before or after these actions, the user performs an operation of issuing an instruction to start photography of the subject's eye. This operation may be conducted, for example, by pressing a photography start trigger button (not shown in the drawings) or inputting a voice instruction. Alternatively, the controller 7 may detect the completion of the preparation phase and automatically shift to the photography phase. In addition, a fixation target (not shown in the drawings) may be presented to the subject (the subject's eye E or the fellow eye thereof).

<First operation example>

Figure 7:
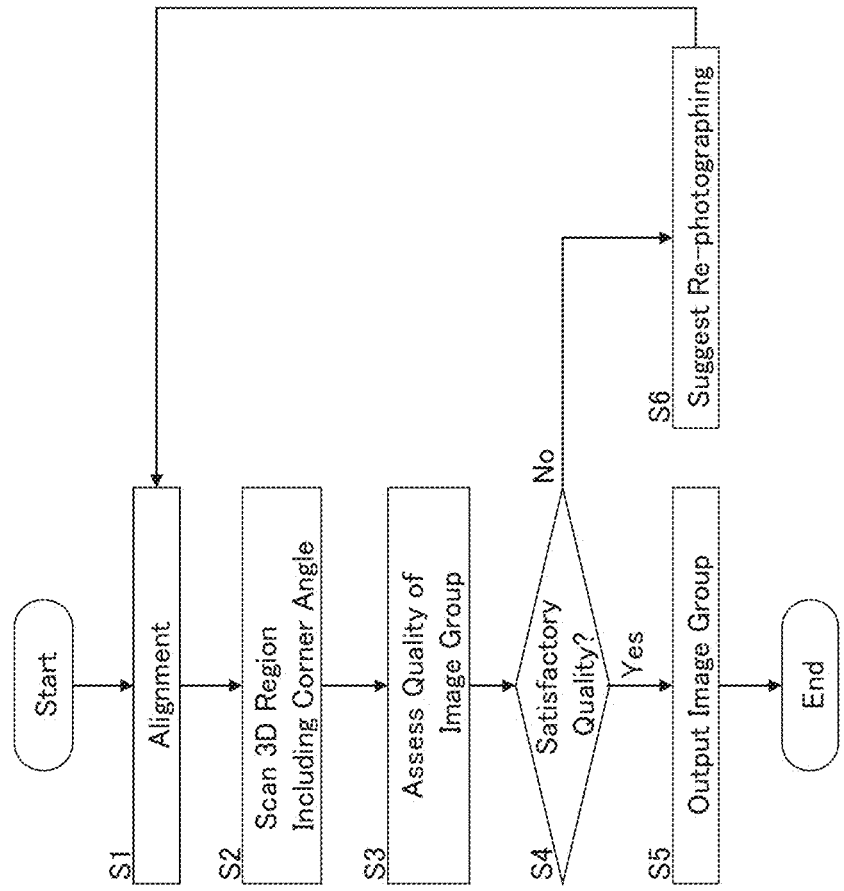
FIG. 7 is a flowchart illustrating an operation of a slit lamp microscope according to an aspect example.

The first operation example performed after the above preparations will be described with reference to FIG. 7.

(S1: Alignment)

Upon commencing photography, the slit lamp microscope 1 performs alignment of the illumination system 2 and the photography system 3 with respect to the subject's eye E. Unlike general alignment operations for aligning the optical axis of an optical system with the corneal apex or the center of the pupil of the subject's eye E, the alignment in the step S1 is performed to place the illumination system 2 and the photography system 3 at a start position of the scan to be performed in the step S2. The mode (aspect) of the alignment of the step S1 may be freely selected or determined, and may be any of the examples described above. An operation such as adjustment of the image sensor 5, focus adjustment, or the like may be performed before the commencement of alignment, during alignment, and/or after the completion of alignment.

(S2: Scan Three Dimensional Region Including Corner Angle)

The slit lamp microscope 1 scans the anterior segment of the subject's eye E by combining the projection of the slit light performed by the illumination system 2, the moving image photography performed by the photography system 3, and the movement of the illumination system 2 and the photography system 3 performed by the movement mechanism 6. This scan is applied to a three dimensional region that includes the corner angle CA. As a result of a single scan (that is, a scan from the scan start position to the scan end position), for example, the image group (a plurality of anterior segment images) F1 to FN shown in FIG. 3 is obtained.

The data processor 8 may be configured to perform predetermined processing on an image obtained by the scan application. For example, freely selected or determined image signal processing and/or freely selected or determined image processing may be applied to an image obtained by the scan application, such as noise elimination, contrast adjustment, brightness adjustment, and color correction.

(S3: Assess Quality of Image Group)

The image group assessing processor 81 executes an assessment of the quality of the image group collected by the scan of the step S2.

(S4: Satisfactory Quality?)

In the case where the image group assessing processor 81 has determined in the step S3 that the quality of the image group is satisfactory (S4: Yes), the operation proceeds to the step S5. On the other hand, in the case where the image group assessing processor 81 has determined in the step S3 that the quality of the image group is not satisfactory (S4: No), the operation shifts to the step S6.

(S5: Output Image Group)

When the image group assessing processor 81 has determined in the step S3 that the quality of the image group is satisfactory (S4: Yes), the controller 7 performs a control to output this image group. In the present example, the controller 7 controls the communication device 9 to transmit the image group to another apparatus.

Examples of an apparatus to which the image group is transmitted include an information processing apparatus and a storage. The information processing apparatus is, for example, a server on a wide area network, a server on a LAN, a computer terminal, or the like. The storage may be a storage device provided on a wide area network, a storage provided on a LAN, or the like.

The image group output in the step S5 may include the background information described above. Alternatively, the background information may be supplementary information attached to the image group. In general, the data structure of the information output in the step S5 may be selected accordingly.

In some typical examples, the image group transmitted in the step S5 includes a series of images of the anterior segment of the subject's right eye and a series of images of the anterior segment of the subject's left eye. The series of images of the right eye and the series of images of the left eye are obtained by applying the operations described in the present example to the right eye and the left eye, respectively. The subject's eye information described above is attached to the series of images of the right eye and the subject's eye information is attached to the series of images of the left eye, whereby the series of images of the right eye and the series of images of the left eye are distinguished from each other.

Identification information of the subject is transmitted together with the image group. The identification information may be the subject ID input into the slit lamp microscope 1, or identification information generated based on the subject ID. For example, the subject ID used for personal identification in the facility where the slit lamp microscope 1 is installed (referred to as internal identification information) may be converted into external identification information used outside the facility. Such identification information conversion makes it possible to improve the information security of personal information such as image groups and background information.

(S6: Suggest Re-Photographing)

In the case where the image group assessing processor 81 has determined in the step S3 that the quality of the image group is not satisfactory (S4: No), the controller 7 then performs a control for collection of another image group from the three dimensional region that includes the corner angle CA. The controller 7 of the present example performs a control for displaying information and/or outputting audio (voice) information to suggest the user to conduct photography again. The user then conducts an operation of issuing an instruction to start re-photographing or an operation of issuing an instruction not to re-perform photography.

If the user performs the operation of issuing the instruction to start re-photographing, the controller 7 performs a control to re-execute the operation from the step S1 (or the step S2). The re-photographing may be repeated, for example, up to a predetermined number of times.

On the other hand, if the user performs the operation of issuing the instruction not to re-perform photography, the controller 7 of some examples may perform a control to transmit the image group determined to be of unsatisfactory quality to another apparatus. Alternatively, the controller 7 of some examples may perform a control to delete, save, or record the image group determined to be of unsatisfactory quality.

The image group transmitted from the slit lamp microscope 1 in the step S5 (or S6) is sent directly or indirectly to an information processing apparatus. A typical example of this information processing apparatus is the aforementioned image interpretation computer terminal for the use of a doctor (or an optometrist).

The doctor can conduct image interpretation of the series of images included in the image group (e.g., the series of images F1 to FN shown in FIG. 3) using the image interpretation computer terminal. Further, a three dimensional image may be constructed from the series of images, a rendered image of the three dimensional image may be displayed, or background information may be displayed. In addition, analysis of any image in the series of images may be performed, analysis of the three dimensional image may be performed, analysis of the rendered image may be performed, or analysis of the background information may be performed by the image interpretation computer terminal or another information processing apparatus.

By using the image interpretation computer terminal, the doctor can generate a report (an image interpretation report) in which information obtained from image interpretation is recorded. The image interpretation report may be offered, for example, to the facility where the slit lamp microscope 1 is installed, to a medical institution designated by the subject or the like, to an information processing apparatus used by a doctor designated by the subject or the like, to an address (e.g., email address, postal address, etc.) registered by the subject or the like. Further, the image interpretation report may be sent to a predesignated database system to be stored and managed.

An image interpretation apparatus is another example of the information processing apparatus that is a destination of the image group transmitted from the slit lamp microscope 1 in the step S5 (or S6). The image interpretation apparatus includes an image interpretation processor. The image interpretation processor is configured to operate, for example, in accordance with a program for image interpretation, and analyze the series of images included in the image group to derive findings. In addition, the image interpretation processor is configured to generate a report based on the findings derived.

The image interpretation processor may include an artificial intelligence engine that performs image interpretation using a learned model (inference model). The artificial intelligence engine of some typical examples includes a convolutional neural network (CNN) trained with training data containing a large number of images acquired by slit lamp microscopes and corresponding image interpretation information.

In the case where the image interpretation apparatus includes an artificial intelligence engine and the slit lamp microscope 1 (the data processor 8) also includes an artificial intelligence engine, these artificial intelligence engines may be adjusted to have equivalent capabilities (abilities, faculties, qualities). In other words, it is possible to make adjustments so that there is no capability difference (so that capability difference is small) between the artificial intelligence engine of the image interpretation apparatus and the artificial intelligence engine of the slit lamp microscope 1. Further in other words, the artificial intelligence engine provided in the image interpretation apparatus may be the same at least in part as the aforementioned artificial intelligence engine provided in the slit lamp microscope 1.

In some aspect examples, both the artificial intelligence engines may be configured by applying the same neural network model and the same parameters. In addition, the models and the parameters of both the artificial intelligence engines may be updated in synchronization with each other.

Such a unified (integrated, synchronized) adjustment of the artificial intelligence engines makes it possible to prevent the inconvenience of inconsistencies or errors between outputs from the artificial intelligence engine of the slit lamp microscope 1 and outputs from the artificial intelligence engine of the image interpretation apparatus. In addition, as described above, the quality assessment conducted before transmitting an image group from the slit lamp microscope 1 is a process of assessing the image quality required for effective image interpretation and diagnosis. Therefore, performing the unified adjustment of the artificial intelligence engines makes it possible to achieve appropriate execution of the image quality assessment of an image group before transmission. With this, an image group that is suitable for image interpretation by the artificial intelligence engine of the image interpretation apparatus can be assessed with high accuracy as a "suitable image group for image interpretation" prior to transmission from the slit lamp microscope 1. Also, an image group that is not suitable for image interpretation by the artificial intelligence engine of the image interpretation apparatus can be assessed with high accuracy as an "unsuitable image group for image interpretation" prior to transmission from the slit lamp microscope 1.

In the case where such a unified adjustment of the artificial intelligence engines is not made, or in the case where image interpretation is requested to another image interpretation apparatus that includes an artificial intelligence engine with a different model and/or parameters, a processing condition of the artificial intelligence engine of the slit lamp microscope 1 may be attached to an image set to be transmitted, and/or, a processing condition of the artificial intelligence engine of the image interpretation apparatus may be attached to an image set to be transmitted. Here, the processing conditions represent a corresponding model, corresponding parameters, or the like.

According to the first operation example as described above, in the case where an image group having a satisfactory quality is acquired by the first scan, this image group can be provided for subsequent processing such as image interpretation. On the other hand, in the case where an image group of a satisfactory quality cannot be acquired by the first scan, the slit lamp microscope 1 can perform acquisition of an image group again. More generally, the slit lamp microscope 1 can repeatedly perform photography until an image group with a satisfactory quality is obtained. Therefore, the slit lamp microscope 1 is capable of providing an image group with a satisfactory quality for subsequent processing in either case where an image group with a satisfactory quality is or is not obtained by the first scan. This concludes the description of the first operation example.

<Second Operation Example>

Figure 8:
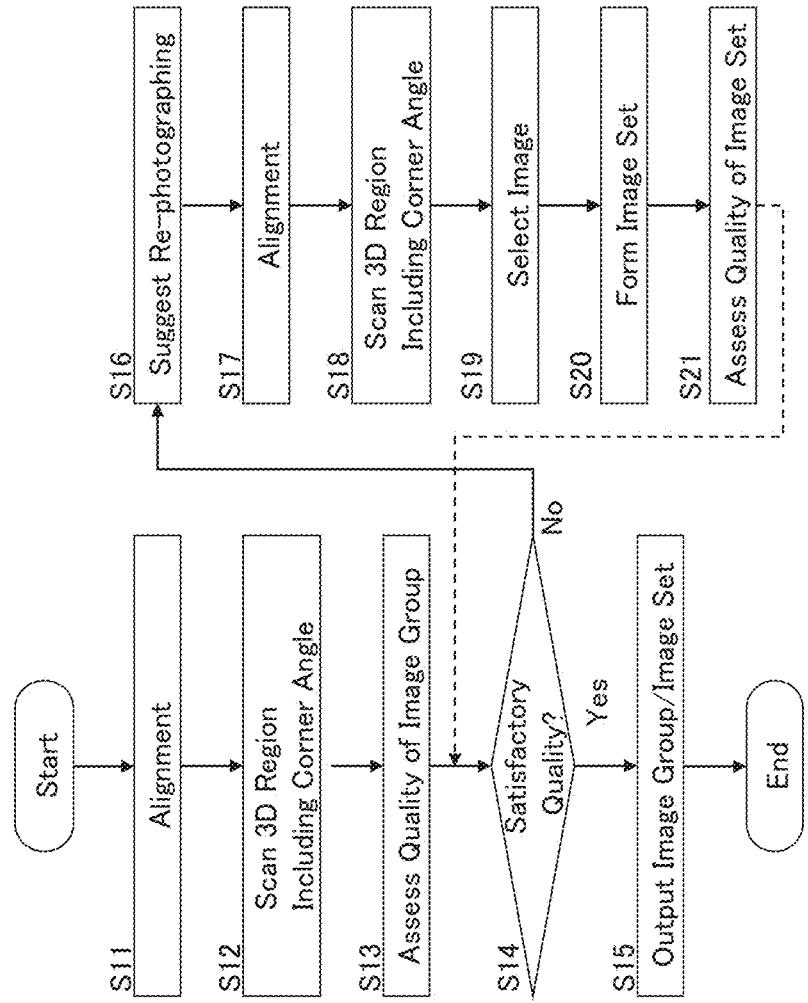
FIG. 8 is a flowchart illustrating an operation of a slit lamp microscope according to an aspect example.

The second operation example of the slit lamp microscope 1 will be described with reference to FIG. 8.

While the first operation example described above is operated to repeat scanning (photography) of a three dimensional region that includes the corner angle until an "image group" with a satisfactory quality is obtained, the present operation example is operated to repeat scanning (photography) until an "image set" with a satisfactory quality is obtained. Here, an image group refers to a series of images collected by a single scan, and an image set refers, for example, to a series of images arranged in a predetermined scan area.

In other words, while data finally obtained by the first operation example is a series of images collected by a single scan, data finally obtained by the present operation example is, for example, a series of images arranged in a predetermined scan area (a three dimensional region that includes the corner angle). To put it another way, data finally obtained by the present operation example may be a series of images obtained by a single scan as in the first operation example, or, unlike the first operation example, may be a series of images selected from two or more image groups obtained by two or more times of scans.

The steps S11 to S13 of the present operation example may be performed in the same manner as the steps S1 to S3 of the first operation example, respectively. Therefore, the description of the steps S11 to S13 is omitted. In addition, the matters and items described in the first operation example may be combined with the present operation example, unless otherwise mentioned.

(S14: Satisfactory Quality?)

In the case where the image group assessing processor 81 has determined in the step S13 that the quality of the image group is satisfactory (S14: Yes), the operation proceeds to the step S15. On the other hand, in the case where the image group assessing processor 81 has determined in the step S13 that the quality of the image group is not satisfactory (S14: No), the operation shifts to the step S16.

(S15: Output Image Group)

When the image group assessing processor 81 has determined in the step S13 that the quality of the image group collected by the first scan is satisfactory (S14: Yes), the controller 7 performs a control to output this image group. As in the first operation example, the controller 7 can transmit this image group to another apparatus by controlling the communication device 9.

(S16: Suggest Re-Photographing)

In the case where the image group assessing processor 81 has determined in the step S13 that the quality of the image group is not satisfactory (S14: No), the controller 7 then performs a control to suggest the user to conduct photography again. The user then performs an operation of issuing an instruction to start re-photographing or an operation of issuing an instruction not to re-perform photography.

In the present operation example, the case of performing re-photographing will be described below. In the case of not performing re-photographing, the same or similar operation as or to the first operation example can also be conducted in the present operation example.

(S17: Alignment)

Upon receiving an instruction from the user to start re-photographing, the controller 7 performs alignment in the same manner as in the step S11.

(S18: Scan Three Dimensional Region Including Corner Angle)

After completing the alignment in the step S17, the slit lamp microscope 1 applies a scan to the three dimensional region that includes the corner angle CA in the same manner as in the step S12. Another image group is obtained by this scan.

(S19: Select Image)

The selecting processor 821 selects one or more images that satisfy a predetermined condition, from among a set of images that includes the image group collected by the scan of the step S12 and the image group collected by the scan of the step S18. Note that in the case where a determination result "No" has been issued two or more times in the step S14, the selecting processor 821 selects one or more images that satisfy the predetermined condition, from a set of images that includes the image group collected by the scan of the step S12 and two or more image groups collected by the two or more times of scans performed in the step S18.

In some aspect examples, the combination of the operation of the step S18 and the operation of the step S19 may be either one of an operation of alternately performing scan application and image selection or an operation of performing image selection after executing all scans, as described above. By such an interlocking operation of the scan application and the image selection, a series of images is selected from two or more image groups obtained by two or more times of scans.

(S20: Form Image Set)

The image set forming processor 82 forms an image set including a series of images selected in the step S19.

(S21: Assess Quality of Image Set)

The image set assessing processor 83 assesses the quality of the image set formed in the step S20.

(S14: Satisfactory Quality?)

In the case where the image set assessing processor 83 has determined in the step S21 that the quality of the image set is satisfactory (S14: Yes), the operation proceeds to the step S15. On the other hand, in the case where the image set assessing processor 83 has determined in the step S21 that the quality of the image set is not satisfactory (S14: No), the operation shifts to the step S16 and then the processes of the steps S16 to S14 are performed again.

(S15: Output Image Set)

When the quality of the image set is determined in the step S13 to be satisfactory (S14: Yes), the controller 7 performs a control to output this image set. In the present example, the controller 7 controls the communication device 9 to transmit the image set to another apparatus.

The destination of the image set transmitted may be the same as or different from the destination of the image group. The image set output may include the background information described above. Alternatively, the background information may be supplementary information attached to the image set. As in the case of the image group, the image set transmitted may include a series of images of the anterior segment of the subject's right eye and a series of images of the anterior segment of the subject's left eye. Furthermore, the subject's eye information may be attached to the series of images of the right eye and the subject's eye information may be attached to the series of images of the left eye. In addition, identification information of the subject may be transmitted together with the image set.

The image set transmitted from the slit lamp microscope 1 in the step S15 is sent directly or indirectly to an information processing apparatus. This information processing apparatus may be an image interpretation computer terminal and/or an image interpretation apparatus, for example.

According to the second operation example as described thus far, in the case where an image group of a satisfactory quality is acquired by the first scan, this image group can be provided for subsequent processing such as image interpretation. On the other hand, in the case where an image group of a satisfactory quality cannot be acquired by the first scan, the slit lamp microscope 1 is capable of acquiring another image group and then forming an image set having a satisfactory quality by selecting a series of images from two or more image groups obtained up to that point of time. More generally, the slit lamp microscope 1 can repeatedly perform photography until an image set with a satisfactory quality is obtained. Therefore, when an image group of a satisfactory quality is acquired by the first scan, this image group can be provided for subsequent processing. In addition, when the first scan yields no image group of a satisfactory quality, an image set of a satisfactory quality can be formed based on two or more image groups acquired by two or more times of scans and this image set can then be provided for subsequent processing. This concludes the description of the second operation example.

The operations that can be performed by the slit lamp microscope 1 of the present aspect example are not limited to the two examples described above. In some examples, the slit lamp microscope 1 may be configured to perform an operation based at least on any one or two or more of the matters and items described in the present aspect examples, any modification thereof, and any known technique or technology.

In some examples, the slit lamp microscope 1 may be configured to directly or indirectly transmit, to an information processing apparatus, an image group collected in a single scan of a three dimensional region including the corner angle CA without carrying out re-photographing as described in the two examples described above.

In addition, the slit lamp microscope 1 may be configured to apply analysis processing to a series of images (image group, image set) collected from a three dimensional region including the corner angle CA to obtain analysis data (corner angle parameter value, anterior segment parameter value, etc.), and then transmit the analysis data directly or indirectly to an information processing apparatus. Alternatively, the slit lamp microscope 1 may be configured to apply analysis processing to a series of images (image group, image set) collected from a three dimensional region including the corner angle CA to obtain analysis data (corner angle parameter value, anterior segment parameter value, etc.), and then transmit the analysis data and the series of images directly or indirectly to an information processing apparatus.

<Advantageous Effects, Etc.>

Some features, some actions, and some advantageous effects of the slit lamp microscope 1 of the present aspect example will be described.

The slit lamp microscope 1 includes a scanner (the illumination system 2, the photography system 3, and the movement mechanism 6) and the memory 10. The scanner is configured to perform application of a scan with slit light to a three dimensional region including the corner angle CA of the subject's eye E, thereby collecting an image group. The memory 10 is configured to store the image group collected by the scanner.

Such a slit lamp microscope 1 allows, first of all, acquisition of an image group representing a three dimensional region that includes the corner angle CA without contacting the subject's eye E, thereby requiring no application of an eye drop anesthesia or a corneal protective agent (ophthalmic gel) to the subject's eye E, which can reduce a burden on the patient. Further, unlike a slit lamp microscope that provides an image of a single cross section as disclosed in Patent Document 6, the slit lamp microscope 1 is capable of acquiring an image group by performing application of a scan to a three dimensional region including the corner angle CA. This makes it possible to observe various sites or parts of the corner angle CA in detail as in the case of using a gonioscope. There may be a case in which a subject's eye is in a state or condition or has a characteristic that makes it impossible or difficult to depict the corner angle with an extremely precise OCT apparatus. In such a case as well, the slit lamp microscope 1 has a high possibility of being able to acquire an image group with the corner angle depicted. This advantage not only can realize acquisition of a satisfactory image more reliable than before, but also improve the reproducibility of photographing. As described thus far, the slit lamp microscope 1 can achieve both detailed observation and reliability in non-contact corner angle observation.

In addition, as described above, acquisition of satisfactory images using a conventional slit lamp microscope requires fine and complicated operations. However, with the remote operation techniques as disclosed in Patent Documents 3 and 4, such difficult operations have to be conducted from a remote place. Therefore, it is considered extremely difficult to obtain images of quality good enough for diagnosis (image interpretation) using a conventional slit lamp microscope with such a conventional remote operation function. Further, although a slit lamp microscope serves an effective role in screening, follow-up observations, and like applications, it can be said, in view of the difficulties of remote operations, that it is practically impossible to use a conventional slit lamp microscope for telemedicine with conventional techniques.

In contrast, the slit lamp microscope 1 of the present aspect example is configured to first perform a scan of the subject's eye E to collect an image group, and hence has an advantage of not requiring remote operations conducted by a doctor as in conventional cases. In other words, conventional methods require a doctor to conduct a medical examination and consultation while performing operations of a slit lamp microscope from a remote place. In the case of employing the slit lamp microscope 1, on the other hand, a doctor only needs to perform image interpretation of an image group acquired in advance. As a consequence, a doctor can be freed from the time and effort required for performing photography, and therefore concentrate on image interpretation. In this way, the present aspect example can contribute to diffusion of high quality slit lamp microscope examinations.

The slit lamp microscope 1 of the present aspect example makes it possible to implement scanning by means of the following configuration. The scanner includes the illumination system 2, the photography system 3, and the movement mechanism 6. The illumination system 2 is configured to project the slit light onto the three dimensional region that includes the corner angle CA. The photography system 3 is configured to perform photography of the three dimensional region that includes the corner angle CA from a direction different from the illumination system 2. The movement mechanism 6 is configured to move the illumination system 2 and the photography system 3. The photography system 3 performs repetitive photography (repetitive acquisition of images) in parallel with movement of the illumination system 2 and the photography system 3 performed by the movement mechanism 6. This repetitive photography is, for example, moving image photography at a photographing rate set in advance.

In the present aspect example, the movement mechanism 6 is configured to perform the movement of the illumination system 2 and the photography system 3 in such a manner that the slit light projected onto the three dimensional region that includes the corner angle CA by the illumination system 2 moves in a width direction of the slit light during scanning with the slit light.

Furthermore, the slit lamp microscope 1 of the present aspect example may have a function as a Scheimpflug camera, for example, in order to acquire an image (two dimensional cross sectional image) in which an area from the anterior surface of the cornea to the posterior surface of the crystalline lens is in focus. For this purpose, the photography system 3 may include the optical system 4 and the image sensor 5. The optical system 4 is configured to direct light (return light) coming from the three dimensional region that includes the corner angle CA onto which the slit light is projected. The image sensor 5 includes a light detecting plane and is configured to receive the light directed by the optical system 4 with the light detecting plane. In addition, the slit lamp microscope 1 may be configured in such a manner that the subject plane along the optical axis of the illumination system 2, the optical system 4, and the image sensor 5 (the light detecting plane) satisfy the Scheimpflug condition.

With such a configuration, it becomes possible to perform photography in which the entire three dimensional region including the corner angle CA is in focus and therefore obtain an image of a satisfactory quality.

As mentioned above, the corner angle is located between the cornea and the iris, and most of corner angle parameters are calculated based on the arrangements or positional relationships between the corner angle and peripheral positions of the corner angle, that is, based on the tissue morphology of and around the corner angle. According to the present aspect example, because of the advantageous feature that a high quality image can be obtained in which the cornea, the iris, and the periphery of the corner angle are in focus, the position of the corner angle can be identified with high accuracy and high precision and also the corner angle parameter calculation can be performed with high accuracy and high precision.

The slit lamp microscope 1 of the present aspect example may include the communication device 9 (first communication device) configured to perform transmission of the image group collected by the scanner to the first external device. This configuration makes it possible to provide the first external device with the image group collected by the scanner.

The slit lamp microscope 1 of the present aspect example may include the data processor 8 configured to execute processing of the image group collected by the scanner. This configuration enables desired processing to be performed on the image group collected by the scanner.

The slit lamp microscope 1 of the present aspect example may include the communication device 9 (second communication device) configured to perform transmission of data generated by the data processor 8 from the image group collected by the scanner to the second external device. This configuration allows the data generated from the image group by the data processor 8 to be provided to the second external device.

The data processor 8 of the slit lamp microscope 1 of the present aspect example may include the image group assessing processor 81 (first assessing processor). The image group assessing processor 81 is configured to execute an assessment of a quality of the image group collected by the scanner.

With this configuration, the quality of the image group collected by scanning the three dimensional region including the corner angle can be assessed by the slit lamp microscope itself. Thus, the quality of the image group can be checked before offering the image group to a doctor or an image interpretation apparatus.

For example, as described below, the present aspect example is capable of switching the control modes (contents of control) according to a result of the assessment of the quality of the image group obtained by the image group assessing processor 81. As a result, when an image group of a satisfactory quality is obtained, suitable processing can be executed accordingly, and when an image group of a satisfactory quality is not obtained, suitable processing can be executed accordingly, too.

The slit lamp microscope 1 of the present aspect example may perform transmission of the image group to the second external device by the means of the communication device 9 when the image group assessing processor 81 assesses that the quality of the image group collected by the scanner is satisfactory.

Such a configuration makes it possible, upon acquisition of an image group of a satisfactory quality, to provide this image group to a doctor who is at a remote place or an image interpretation apparatus located at a remote place, for example.

The slit lamp microscope 1 of the present aspect example may include the controller 7 (first controller) configured in the following manner. The controller 7 is configured to execute a control of the scanner to apply another scan to the three dimensional region including the corner angle CA when the image group assessing processor 81 assesses that the quality of the image group is not satisfactory. The control mode for causing the scanner to conduct another scan may be any of the following controls, for example: a control for suggesting the user to carry out photography again; and a control for automatically performing photography again (a control for automatically shifting to re-photographing).

According to this configuration, it is possible to smoothly shift to re-photographing (re-scanning) in the case where an image group of a satisfactory quality cannot be acquired by one time of scan.

The slit lamp microscope 1 of the present aspect example may include the image set forming processor 82. The image set forming processor 82 is configured to execute a formation of an image set by selecting a series of images corresponding to a predetermined scan area from two or more image groups that include the image group acquired already by the scan applied to the three dimensional region including the corner angle CA and another image group collected by another scan applied to the three dimensional region including the corner angle CA.

According to this configuration, in the case where two or more times of scans are applied to the subject's eye, an image set can be formed with a series of images selected from two or more image groups obtained by the two or more times of scans. This improves the possibility of obtaining an image set of satisfactory quality. For example, even in the case where a satisfactory image cannot be obtained due to the occurrence of blinking or eye movements during execution of a scan, an image obtained through another scan can be used as a replacement for a corresponding unsatisfactory image.

The slit lamp microscope 1 of the present aspect example may include the image set assessing processor 83 (second assessing processor) configured to execute an assessment of the quality of the image set formed by the image set forming processor 82. In some examples, the image set assessing processor 83 may be configured to be capable of performing an assessment of any of the following condition items for the series of images included in the image set: the arrangement order of the series of images; lack or omission of an image in the series of images; and misalignment of the series of images. This assessment may be executed by analyzing the series of images in the image set. For example, the image set assessing processor 83 may execute a quality assessment of the series of images based on a landmark in a series of frames. The landmark may be an image region corresponding to a tissue or a site such as the cornea, the iris, the pupil, or the corner angle.

By performing such an assessment of an image set, it becomes possible to prepare an image set having a satisfactory quality that makes it possible for a doctor or an image interpretation apparatus to achieve effective performance of image interpretation.

The slit lamp microscope 1 of the present aspect example may perform transmission of the image set to the second external device by the means of the communication device 9 when the image set assessing processor 83 assesses that the quality of the image set is satisfactory.

Such a configuration makes it possible, upon acquisition of an image set of a satisfactory quality, to provide this image set to a doctor who is at a remote place or an image interpretation apparatus located at a remote place, for example.

The slit lamp microscope 1 of the present aspect example may include the controller 7 (second controller) configured in the following manner. The controller 7 is configured to execute a control of the scanner to apply another scan to the three dimensional region including the corner angle CA when the image set assessing processor 83 assesses that the quality of the image set is not satisfactory. The control mode for causing the scanner to conduct another scan may be any of the following controls, for example: a control for suggesting the user to carry out photography again; and a control for automatically performing photography again (a control for automatically shifting to re-photographing).

According to this configuration, it is possible to smoothly shift to re-photographing (re-scanning) in the case where an image set of a satisfactory quality cannot be acquired by two or more times of scans performed up to the current stage.

In the slit lamp microscope 1 of the present aspect example, the scanner may be configured to perform application of a scan with the slit light to a three dimensional region including an entirety of the corner angle CA. The entire corner angle CA is a site having a substantially circular shape along the corneal edge (along the vicinity of the corneal edge) of the subject's eye E. By performing application of a scan that contains the entire cornea C, the slit lamp microscope 1 can acquire an image group corresponding to a three dimensional region that includes the entire corner angle CA. This makes it possible to conduct observation of the entire corner angle CA, enabling detailed examination same as or similar to that of a gonioscope.

<Some Additional Matters and Items>

Some aspect examples described above are merely examples of the implementation of the present disclosure, and any modifications (e.g., omission, substitution, replacement, addition, etc.) may be made within the scope of the present disclosure to the above aspect examples.

The aspect example described above is configured to execute an assessment of an image group and/or an image set each time a single scan is performed. In some other aspect examples, the slit lamp microscope may be configured to first perform a plurality of times of scans in succession to collect a plurality of image groups, and then to execute a formation of an image set from the plurality of images groups collected. In other words, the slit lamp microscope of the present aspect example may be configured in the following manner: the scanner is configured to perform application of two or more times of scans to a three dimensional region that includes the corner angle to collect two or more image groups; and the data processor (image set forming processor) is configured to execute a formation of an image set by executing selection of a series of images corresponding to a scan area from the two or more image groups collected. According to the present aspect example, a satisfactory image set can be obtained as long as no inconvenience (e.g., blinking, eye movement, etc.) occurs during all of the plurality of times of scans. Therefore, the present aspect example can increase the possibility of acquiring a satisfactory image set.

A slit lamp microscope according to any of the aspect examples may be used for any purpose, and may have a function for that purpose. A slit lamp microscope of some aspect examples may have a statistical analysis function and/or a follow-up observation function. These functions are used to execute an assessment of the state or condition of the subject's eye (the anterior segment, especially the corner angle) in quantitative and objective manner. According to the slit lamp microscope of some aspect examples, non-contact corner angle observation can be performed in detail and with reliability as described above, allowing statistical analysis and follow-up observation to be performed effectively and suitably. Note that an apparatus other than the slit lamp microscope may have these functions (the same applies hereinafter). Examples of this apparatus include an information processing apparatus, an image interpretation computer terminal, an image interpretation apparatus, an ophthalmic apparatus, and so forth.

The slit lamp microscope configured in this way has a function of calculating a value of a predetermined parameter by analyzing an image acquired based on a scan applied to the anterior segment (the three dimensional region including the corner angle) of the subject's eye. This function is referred to as a parameter calculating function. The image to be analyzed may be any kind of image, and may be any of the following examples: an image group collected by the scan; at least one image included in the image group; a three dimensional image constructed from at least one or more images of the image group; a rendered image of the three dimensional image; an image set obtained from two or more images; at least one image included in the image set; a three dimensional image constructed from at least one or more images of the image set; and a rendered image of this three dimensional image. The parameter to be calculated may be any kind of parameter, and may include, for example, any of the corner angle parameters described above and/or any of the anterior segment parameters described above. Parameter calculation includes a process according to a parameter of interest. In some typical examples, parameter calculation may include segmentation, feature point detection, distance measurement, ratio calculation, angle calculation, and so forth.

Examples of a statistical analysis function include a comparison with data obtained from normal eyes and a comparison with data obtained from eyes with diseases. The former comparison function is referred to as a normative data comparison function and the latter comparison function is referred to as an affected eye data comparison function.

A slit lamp microscope that has the normative data comparison function includes a normal eye database (normative database) obtained by executing statistical processing of parameter values acquired from a large number of normal eyes. Alternatively, a slit lamp microscope that has the normative data comparison function may be configured to be capable of referring to a normative database stored in another apparatus. A typical normative database defines a normal range(s) for parameter values. The slit lamp microscope determines whether or not a parameter value obtained from the subject's eye falls within the normal range. If the parameter value obtained from the subject's eye belongs to the normal range, the subject's eye is determined to be normal (at least with respect to this parameter). If the slit lamp microscope determines that the parameter value obtained from the subject's eye does not belong to the normal range, the subject's eye is determined to be abnormal (at least with respect to this parameter).

A slit lamp microscope that has the affected eye data comparison function includes a database for a specific disease (affected eye database). Alternatively, a slit lamp microscope that has the affected eye data comparison function may be configured to be capable of referring to an affected eye database stored in another apparatus. An affected eye database is obtained by executing statistical processing of parameter values acquired from a large number of eyes diagnosed as having a specific disease (an eye with this disease, an affected eye). A typical affected eye database defines an abnormal range(s) for parameter values. In the case where a target of an assessment is a corner angle, the specific disease may be glaucoma, and/or, may be subtypes or conditions of glaucoma such as open-angle, narrow angle, closed-angle, and so forth. The slit lamp microscope determines whether or not a parameter value obtained from the subject's eye falls within the abnormal range. If the parameter value obtained from the subject's eye does not belong to the abnormal range, the subject's eye is determined to be normal (at least with respect to this parameter). If the slit lamp microscope determines that the parameter value obtained from the subject's eye belongs to the abnormal range, the subject's eye is determined to be abnormal (at least with respect to this parameter).

In some typical examples, a slit lamp microscope with the follow-up observation function has a function of comparing time-series data (time course data, time-dependent change data, chronological data, or the like) of the same patient or a function of presenting time-series data of the same patient in a comparable manner. For example, the slit lamp microscope with the follow-up observation function has any of the following functions: a function of determining the amount of time-series change in a plurality of parameter values acquired on the first to K-th dates and times for the same patient; a function of determining a trend of the plurality of parameter values; a function of comparing the time-series change in the plurality of parameter values with a standard change (standard change for normal eyes or standard change for affected eyes); and a function of estimating a future value based on the plurality of parameter values (and the standard change). Further, the slit lamp microscope has a function of presenting a result obtained by any of these functions. Any method and technique may be employed to present the result, such as a graph, histogram, map, color code, or other aspects.

The present disclosure provides a method of controlling a slit lamp microscope according to any of the aspect examples. A slit lamp microscope includes a processor and a scanner. The scanner is configured to perform application of a scan with slit light to the anterior segment of the subject's eye to collect an image group. The present control method includes at least a step of causing the processor to execute a control of the scanner to perform application of a scan to a three dimensional region that includes the corner angle.

The present disclosure provides a program that causes a computer to execute the control method described above. In addition, the present disclosure provides a computer-readable non-transitory recording medium that stores such this program. The non-transitory recording medium may be in any form, and examples of the non-transitory recording medium include a magnetic disk, an optical disk, a magneto-optical disk, and a semiconductor memory.

The present disclosure provides an imaging method and data processing method according to any of the aspect examples. The imaging method includes at least a step of performing application of a scan to a three dimensional region including the corner angle of the subject's eye to collect an image group. The data processing method is a method of processing an image group collected by performing application of a scan to a three dimensional region including the corner angle of the subject's eye. In addition, the data processing method may include and any of the data processing methods described in any of the aspect examples such as an arithmetic method, a calculating method, an image processing method, an image analysis method, and so forth.

The present disclosure provides a program that causes a computer to execute such an imaging method and/or processing method. In addition, the present disclosure provides a computer-readable non-transitory recording medium in which such a program is stored.

While certain embodiments have been described, these embodiments have been presented by way of example only, and are not intended to limit the scope of the inventions. Indeed, the novel embodiments described herein may be embodied in a variety of other forms; furthermore, various omissions, substitutions, additions and changes in the form of the embodiments described herein may be made without departing from the spirit of the inventions. The accompanying claims and their equivalents are intended to cover such forms or modifications as would fall within the scope and spirit of the inventions.

What is claimed is:

1. A slit lamp microscope comprising:
   a scanner configured to perform application of a first scan with slit light to a three dimensional region including a corner angle of a subject's eye to collect a first image group; and
   a memory configured to store the first image group collected by the scanner;
   a data processor configured to execute processing of the first image group; and
   a communication device configured to perform transmission of data generated from the first image group by the data processor to an external device.

2. The slit lamp microscope according to claim 1, wherein the scanner includes an illumination system configured to project the slit light onto the three dimensional region,
   a photography system configured to perform photography of the three dimensional region from a direction different from the illumination system, and
   a movement mechanism configured to move the illumination system and the photography system,
   wherein the photography system is configured to perform repetitive photography in parallel with movement of the illumination system and the photography system performed by the movement mechanism.

3. The slit lamp microscope according to claim 2, wherein the photography system includes
   an optical system configured to direct light coming from the three dimensional region onto which the slit light is projected, and
   an image sensor including a light detecting plane configured to receive the light directed by the optical system,
   wherein a subject plane along an optical axis of the illumination system, the optical system, and the light detecting plane satisfy a Scheimpflug condition.

4. The slit lamp microscope according to claim 2, wherein the movement mechanism is configured to perform the movement of the illumination system and the photography system such that the slit light projected onto the three dimensional region by the illumination system moves in a width direction of the slit light.

5. The slit lamp microscope according to claim 1, further comprising another communication device configured to perform transmission of the first image group to another external device.

6. The slit lamp microscope according to claim 1, wherein the data processor includes a first assessing processor configured to execute an assessment of a quality of the first image group collected by the scanner.

7. The slit lamp microscope according to claim 6, wherein the communication device perform transmission of the first image group to the external device when the first assessing processor assesses that the quality of the first image group is satisfactory.

8. The slit lamp microscope according to claim 6, further comprising a first controller configured to execute a control of the scanner to perform a second scan on the three dimensional region when the first assessing processor assesses that the quality of the first image group is not satisfactory.

9. The slit lamp microscope according to claim 8, wherein the data processor further includes an image set forming processor configured to execute a formation of an image set by selecting a series of images corresponding to a scan area from at least two image groups that include the first image group and a second image group collected by the second scan.

10. The slit lamp microscope according to claim 1, wherein
    the scanner is configured to perform collection of at least two image groups by performing application of at least two times of scans to the three dimensional region, and
    the data processor includes an image set forming processor configured to execute a formation of an image set by selecting a series of images corresponding to a scan area from the at least two image groups.

11. The slit lamp microscope according to claim 9, further comprising a second assessing processor configured to execute an assessment of a quality of the image set formed by the image set forming processor.

12. The slit lamp microscope according to claim 11, wherein the communication device performs transmission of the image set to the external device when the second assessing processor assesses that the quality of the image set is satisfactory.

13. The slit lamp microscope according to claim 11, further comprising a second controller configured to execute a control of the scanner to perform a third scan on the three dimensional region when the second assessing processor assesses that the quality of the image set is not satisfactory.

14. The slit lamp microscope according to claim 1, wherein the scanner is configured to perform application of a scan with the slit light to a three dimensional region including an entirety of the corner angle.

15. The slit lamp microscope according to claim 10, further comprising a second assessing processor configured to execute an assessment of a quality of the image set formed by the image set forming processor.

16. The slit lamp microscope according to claim 15, wherein the communication device performs transmission of the image set to the external device when the second assessing processor assesses that the quality of the image set is satisfactory.

17. The slit lamp microscope according to claim 15, further comprising a second controller configured to execute a control of the scanner to perform a fourth scan on the three dimensional region when the second assessing processor assesses that the quality of the image set is not satisfactory.

18. A slit lamp microscope comprising:
a scanner configured to perform application of a first scan with slit light to a three dimensional region including a corner angle of a subject's eye to collect a first image group;
a memory configured to store the first image group collected by the scanner; and
a data processor configured to execute processing of the first image group,
wherein the data processor includes a first assessing processor configured to execute an assessment of a quality of the first image group collected by the scanner.

19. A slit lamp microscope comprising:
a scanner configured to perform application of a first scan with slit light to a three dimensional region including a corner angle of a subject's eye to collect a first image group;
a memory configured to store the first image group collected by the scanner; and
a data processor configured to execute processing of the first image group, wherein
the scanner is configured to perform collection of at least two image groups by performing application of at least two times of scans to the three dimensional region, and
the data processor includes an image set forming processor configured to execute a formation of an image set by selecting a series of images corresponding to a scan area from the at least two image groups.

20. The slit lamp microscope according to claim 6, wherein the communication device perform the transmission of the data generated from the first image group to the external device when the first assessing processor assesses that the quality of the first image group is satisfactory.

* * * * *